US012578226B2

(12) United States Patent
Burguete Lopez et al.

(10) Patent No.: US 12,578,226 B2
(45) Date of Patent: Mar. 17, 2026

(54) HYPERSPECTRAL IMAGING APPARATUS AND METHODS

(71) Applicant: KING ABDULLAH UNIVERSITY OF SCIENCE AND TECHNOLOGY, Thuwal (SA)

(72) Inventors: Arturo Burguete Lopez, Thuwal (SA); Andrea Fratalocchi, Thuwal (SA); Fedor Getman, Thuwal (SA); Maksim Makarenko, Thuwal (SA); Qizhou Wang, Thuwal (SA)

(73) Assignee: KING ABDULLAH UNIVERSITY OF SCIENCE & TECHNOLOGY, Thuwal (SA)

( * ) Notice: Subject to any disclaimer, the term of this patent is extended or adjusted under 35 U.S.C. 154(b) by 74 days.

(21) Appl. No.: 18/708,761

(22) PCT Filed: Nov. 9, 2022

(86) PCT No.: PCT/IB2022/060763
§ 371 (c)(1),
(2) Date: May 9, 2024

(87) PCT Pub. No.: WO2023/084401
PCT Pub. Date: May 19, 2023

(65) Prior Publication Data
US 2025/0012632 A1      Jan. 9, 2025

Related U.S. Application Data

(60) Provisional application No. 63/277,741, filed on Nov. 10, 2021.

(51) Int. Cl.
G01J 3/28 (2006.01)
G01J 3/12 (2006.01)
G06T 9/00 (2006.01)

(52) U.S. Cl.
CPC ............... G01J 3/2823 (2013.01); G01J 3/28 (2013.01); G01J 3/2803 (2013.01); G06T 9/00 (2013.01);
(Continued)

(58) Field of Classification Search
CPC ................... G01J 3/2823; G01J 3/2803; G01J 2003/2806; G01J 2003/2826;
(Continued)

(56) References Cited

U.S. PATENT DOCUMENTS

| | | | | | |
|---|---|---|---|---|---|
| 5,729,011 A | * | 3/1998 | Sekiguchi | ................. | G01J 3/14 |
| | | | | | 250/226 |
| 6,804,400 B1 | | 10/2004 | Sharp | | |

(Continued)

FOREIGN PATENT DOCUMENTS

| | | | | | |
|---|---|---|---|---|---|
| CN | | 110 719 447 | | 1/2020 | |
| CN | | 110719447 A | * | 1/2020 | ............ G01J 3/2823 |
| WO | WO 2020/157560 | | | 8/2020 | |

OTHER PUBLICATIONS

Makarenko, M., et al. "Supplementary information for: Real-time hyperspectral imaging in hardware via trained metasurface encoders." (Year: 2022).*

(Continued)

*Primary Examiner* — Dominic J Bologna
(74) *Attorney, Agent, or Firm* — Joshua B. Brady; Nixon & Vanderhye, P.C.

(57) ABSTRACT

Hyperspectral imaging apparatus and methods in which flat optic metasurfaces encode wavelengths of light using their spatial geometry to produce a desired transmission response. The metasurfaces are inversely designed using machine learning techniques to retain in their transmission response (Continued)

information that is sufficient to facilitate substantial reconstruction of the original hyperspectral scene for given applications.

18 Claims, 19 Drawing Sheets

(52) U.S. Cl.
CPC .............. *G06T 9/002* (2013.01); *G06T 9/007* (2013.01); *G01J 2003/1226* (2013.01); *G01J 2003/2806* (2013.01); *G01J 2003/2826* (2013.01)

(58) Field of Classification Search
CPC ..... G01J 2003/1226; G01J 3/28; G06T 9/002; G06T 9/007; G06T 9/00
See application file for complete search history.

(56) References Cited

U.S. PATENT DOCUMENTS

| 9,979,853 | B2 * | 5/2018 | Rhoads | .............. H04N 1/32309 |
| 2011/0025870 | A1 | 2/2011 | Baraniuk et al. | |
| 2015/0136954 | A1 | 5/2015 | Wein | |
| 2015/0276478 | A1 * | 10/2015 | Geelen | ................... G02B 5/201 |
| | | | | 356/454 |
| 2016/0066775 | A1 | 3/2016 | Hunter et al. | |
| 2017/0284867 | A1 * | 10/2017 | Gensemer | ............. G01J 3/0221 |

OTHER PUBLICATIONS

Makarenko, Maksim, et al. "Real-time hyperspectral imaging in hardware via trained metasurface encoders." Proceedings of the IEEE/CVF Conference on Computer Vision and Pattern Recognition. 2022. (Year: 2022).*
Wu, Renjie, et al. "Optimized multi-spectral filter arrays for spectral reconstruction." Sensors 19.13 (2019): 2905. (Year: 2019).*
English machine translation of CN 110719447 (Year: 2020).*
International Search Report for PCT/IB2022/060763 mailed Feb. 14, 2023, 3 pages.
Written Opinion of the ISA for PCT/IB2022/060763 mailed Feb. 14, 2023, 5 pages.
Extended European Search Report for Application No. 22892231.6 dated Oct. 13, 2025.
Jules Billuart, "Conception d'optiques planes multifonctionnelles part structuration sub-longueur d'onde", Thales, Institute Fresnel, Marseille, Aug. 29, 2021, XP 093114701.

* cited by examiner

TDCMT resonances

C $\mathbf{H}(\omega)$ $\omega$ $\beta \cdot \sigma(\omega - W)$ $\beta = \mathbf{C} \cdot \mathbf{K}^{\dagger}$ trainable resonances of
universal approximator H(ω)

C $\mathbf{H}(\omega)$ $\omega$ $\beta \cdot \sigma(\omega - W)$ $\beta = \mathbf{C} \cdot \mathbf{K}^{\dagger}$

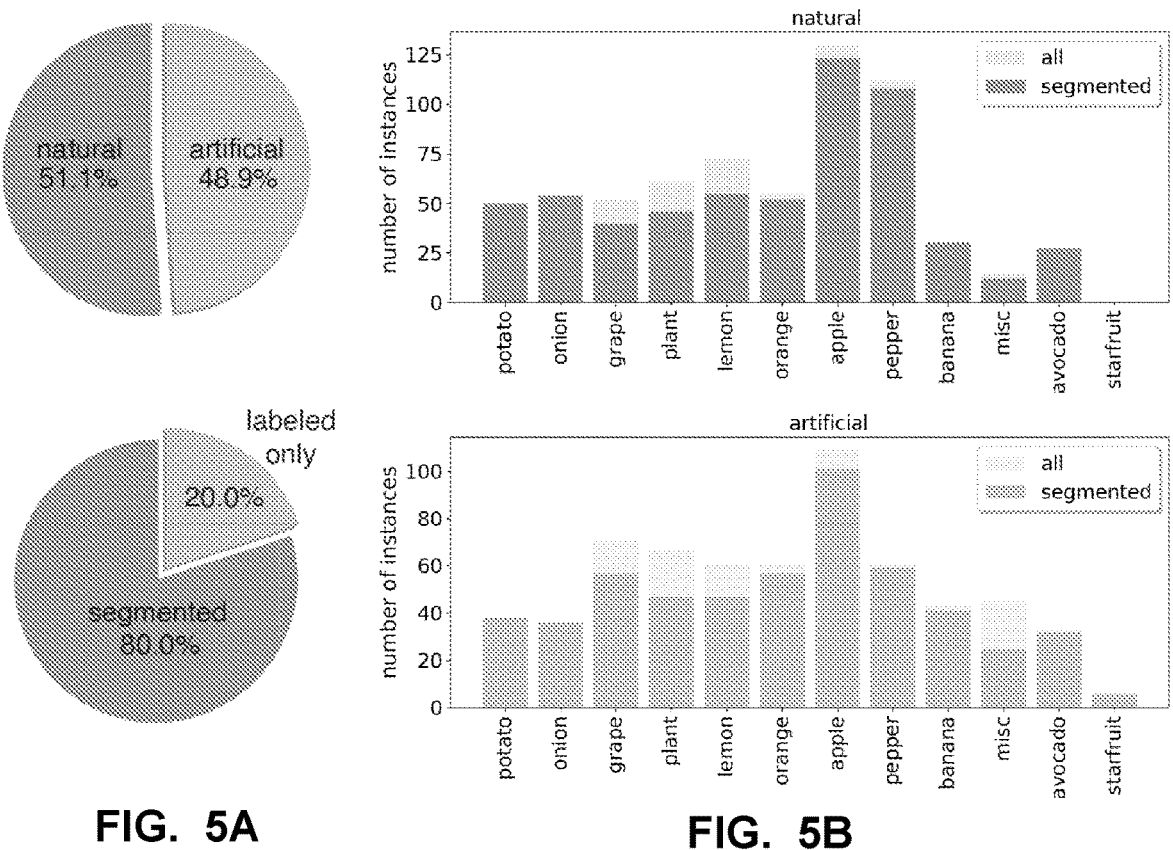
FIG. 5A    FIG. 5B
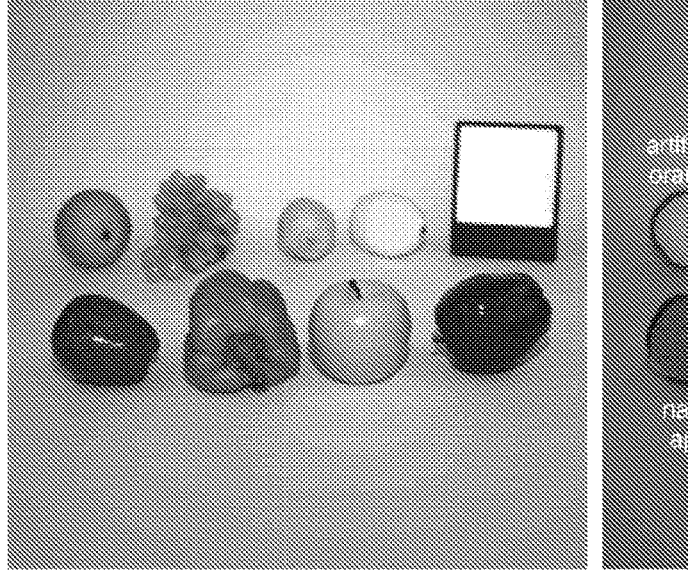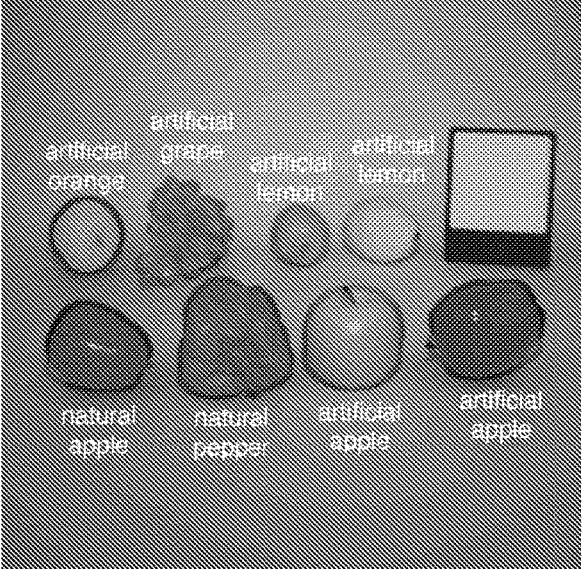
FIG. 5C

MLP NRM DRP

FIG. 8B

RGB
photo spectral
prediction

RGB
prediction ground
truth

HYPERSPECTRAL IMAGING APPARATUS AND METHODS

CROSS-REFERENCE

This application is the U.S. national phase of International Application No. PCT/IB2022/060763 filed Nov. 9, 2022 which designated the U.S. and claims priority to U.S. 63/277,741 filed Nov. 10, 2021, the entire contents of each of which are hereby incorporated by reference.

TECHNICAL FIELD

The disclosed exemplary embodiments relate to hyperspectral imaging and, in particular, to apparatus and methods for hyperspectral imaging using metasurface encoders.

BACKGROUND

Hyperspectral imaging is gaining considerable interest in many areas including civil, environmental, aerial, military, and biological sciences for estimating spectral features that allow the identification and remote sensing of complex materials. Ground-based hyperspectral imaging enables automated classification for food inspection, surgery, biology, dental and medical diagnosis. Likewise, aerial and submarine hyperspectral imaging are currently opening new frontiers in agriculture and marine biology for the taxonomic classification of fauna, and through aerial drone footage for precision agriculture or resource or mineral exploration or inspection. The present state-of-the-art in hyperspectral imaging, however, still faces problems of expensive setup cost, time-consuming data post-processing, low speed of data acquisition, and the needs of macroscopic optical and mechanical components. A single hyperspectral image obtained from a high-resolution camera typically requires gigabytes of storage space, making it extremely difficult to perform real-time video analysis with today's computer vision techniques.

Computational hyperspectral reconstruction from a single RGB image is one technique to overcome some of the challenges mentioned above. Hyperspectral cameras based on integrated diffractive optical elements have been proposed, and others have leveraged deep neural networks for designing spectral reconstruction filters. While these approaches could help address the problem of speed, they are not yet able to tackle the issues of complexity, cost, and slow data processing. Other bottlenecks are the use of elementary filter responses, which are not optimized beyond primitive thin-film interference patterns, and the lack of integrated structures that could exploit the modern footprint of CCD/CMOS sensors.

SUMMARY

The following summary is intended to introduce the reader to various aspects of the detailed description, but not to define or delimit any invention.

In at least one broad aspect, there is provided a hyperspectral imaging apparatus, the apparatus comprising: an encoder layer comprising an i*j array of encoding sub-arrays, each encoding sub-array comprising an m*n array of spectral encoders having a plurality of respective transmission characteristics, the plurality of respective transmission characteristics selected to encode a hyperspectral frequency range in a k-dimensional space, where k is m*n; an imaging layer comprising an i*j array of detecting sub-arrays aligned with the i*j array of encoding sub-arrays of the encoder layer, each detecting sub-array comprising an m*n array of photodetectors, each photodetector arranged to detect a respective transmission response of a respective spectral encoder in response to broadband light, wherein the imaging layer outputs an i*j array of pixel responses, each pixel response comprising a pixel vector of m*n transmission responses; and a processor configured to decode the i*j array of pixel responses into a corresponding i*j array of pixel spectra to produce an output image encompassing the hyperspectral frequency range.

In some cases, each spectral encoder is a flat optic device.

In some cases, the flat optic device comprises a respective patterned nanostructure selected to produce the respective transmission characteristic.

In some cases, each of the respective plurality of transmission characteristics is linear. In some cases, each of the respective plurality of transmission characteristics is nonlinear.

In some cases, the respective plurality of transmission characteristics of the respective spectral encoders within each encoding sub-array are selected by iteratively minimizing a loss function while optimizing the transmission characteristic for an application.

In some cases, the respective plurality of transmission characteristics of the respective spectral encoders within each encoding sub-array are selected by determining k principal components that encode eigenvectors with minimum loss for an application.

In some cases, the k principal components are determined by performing singular value decomposition.

In some cases, the processor decodes each pixel response of the i*j array of pixel responses using a linear projector.

In another broad aspect, there is provided a hyperspectral imaging method, the method comprising: providing an encoder layer comprising an i*j array of encoding sub-arrays, each encoding sub-array comprising an m*n array of spectral encoders having a plurality of respective transmission characteristics, the plurality of respective transmission characteristics selected to encode a hyperspectral frequency range in a k-dimensional space, where k is m*n; providing an imaging layer comprising an i*j array of detecting sub-arrays aligned with the i*j array of encoding sub-arrays of the encoder layer, each detecting sub-array comprising an m*n array of photodetectors; exposing the encoder layer to capture light; detecting, at each photodetector, a respective transmission response of a respective spectral encoder in response to the broadband light; outputting an i*j array of pixel responses from the imaging layer, each pixel response comprising a pixel vector of m*n transmission responses; and decoding the i*j array of pixel responses into a corresponding i*j array of pixel spectra to produce an output image encompassing the hyperspectral frequency range.

In some cases, each spectral encoder is a flat optic device.

In some cases, the flat optic device comprises a respective patterned nanostructure selected to produce the respective transmission characteristic.

In some cases, each of the respective plurality of transmission characteristics is linear. In some cases, each of the respective plurality of transmission characteristics is nonlinear.

In some cases, the respective plurality of transmission characteristics of the respective spectral encoders within each encoding sub-array are selected by iteratively minimizing a loss function while optimizing the transmission characteristic for an application.

In some cases, the respective plurality of transmission characteristics of the respective spectral encoders within each encoding sub-array are selected by determining k principal components that encode eigenvectors with minimum loss for an application.

In some cases, the k principal components are determined by performing singular value decomposition.

In some cases, the processor decodes each pixel response of the i*j array of pixel responses using a linear projector.

BRIEF DESCRIPTION OF THE DRAWINGS

The drawings included herewith are for illustrating various examples of articles, methods, apparatus and systems of the present specification and are not intended to limit the scope of what is taught in any way. In the drawings:

FIG. 5A is a pie chart illustrating the distribution of object classes in a FVgNET dataset;

FIG. 5B is a bar chart illustrating the distribution of object classes in the FVgNET dataset;

FIG. 5C is a raster image that illustrates semantic segmentation masks determined in accordance with at least one embodiment;

FIG. 8A is a schematic diagram illustrating an example network model of a differentiable hybrid inverse design predictor in accordance with at least one embodiment;

FIG. 8B is a schematic diagram illustrating a fully-connected block of the example network model of FIG. 8A;

DETAILED DESCRIPTION

Figure 1A:
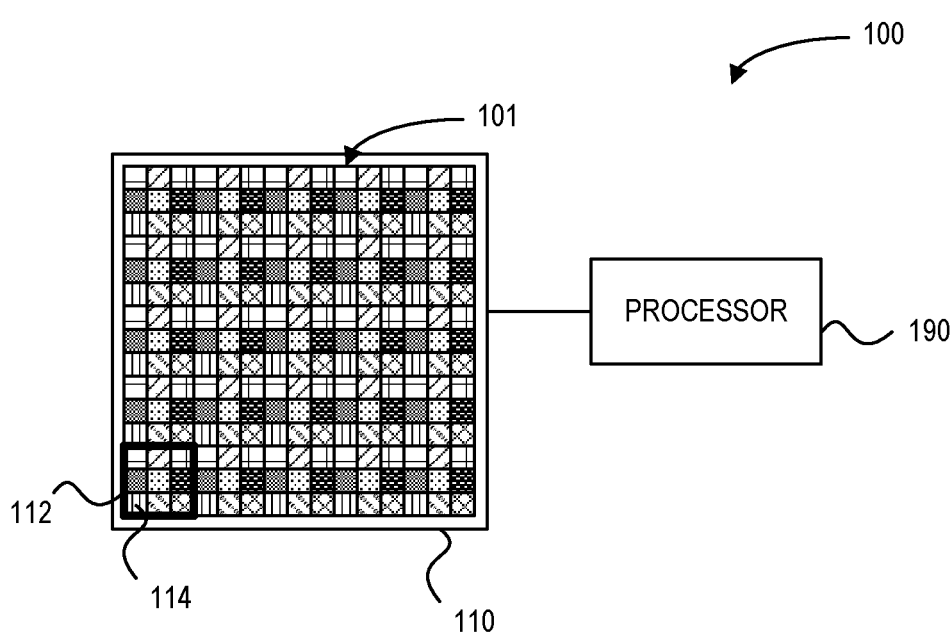
FIG. 1A is a plan view of an imaging apparatus in accordance with at least one embodiment.

Hyperspectral imaging has attracted significant attention to identify spectral signatures for image classification and automated pattern recognition in computer vision. Existing implementations of snapshot hyperspectral imaging rely on bulky, non-integrated, and expensive optical elements, including lenses, spectrometers, and filters. These macroscopic components, along with the large data sizes (some in the gigabyte range) associated with these systems, typically do not allow fast data processing for, e.g., real-time and high-resolution videos.

The described embodiments generally provide an integrated architecture for a hyperspectral imaging apparatus that is CMOS-compatible, and that replaces bulk optics with nanoscale, flat optic metasurfaces that can encode wavelengths of light using their spatial geometry to produce a desired transmission response. Examples of metasurfaces are described, e.g., in U.S. Patent Application No. 62/799,324, entitled FLAT OPTICS POLARIZER BEAM SPLITTER, and U.S. Patent Application No. 2022/0091318 A1, entitled LIGHT PROCESSING DEVICE BASED ON MULTILAYER NANO-ELEMENTS. In some cases, the metasurfaces may be inversely designed using machine learning techniques to retain in their transmission response information that is substantially complete and reconstructable for given applications. Unlike traditional RGB narrowband color filters, metasurfaces can have a variety of transmission characteristics, not limited to a single band, and therefore wideband information can be successfully reconstructed. Moreover, metasurfaces can integrate with various basic optical components for different applications.

The described embodiments do not require specialized spectrometers but instead can make use of conventional monochrome image sensors or cameras, thus opening up the possibility of real-time and high-resolution hyperspectral imaging with reduced complexity and cost. The performance of the imaging apparatus is sufficiently fast as to support real-time image and/or video capture. The described embodiments generally employ a model-driven optimization, which can connect the physical metasurface layer with modern visual computing approaches based on end-to-end training. The described embodiments leverage this technology to compress high-dimensional spectral data into a low-dimensional space via suitably defined projectors (see, e.g., FIGS. 1C and 1D, described further herein), designed with end-to-end learning based on large hyperspectral datasets. Inverse-design software exploiting artificial intelligence (AI) that can be used to design the metasurface projectors has been described, e.g., in U.S. Patent Application No. 62/799,324; Getman et al., "Broadband vectorial ultrathin optics with experimental efficiency up to 99% in the visible region via universal approximators," Light: Science & Applications, 10 (1): 1-14, March 2021; and Makarenko et al., "Robust and scalable flat-optics on flexible substrates via evolutionary neural networks," Advanced Intelligent Systems, page 2100105, August 2021. These nanostructures are patterned to encode broadband information carried by incoming spectra into a barcode composed of a discrete pattern of intensity signals (see, e.g., FIG. 1D, described further herein). A physical model-aware framework determines the optimal projectors' response with various learning schemes, designed based on the desired application.

Conventional RGB cameras project the entire visible spectra into filters of only three primary colors, therefore conventional hyperspectral reconstruction generally involves inverse projection from low-dimensional RGB images to densely sampled hyperspectral images (HSI). Metamerism is an effect in which different spectral power distributions result in similar activation levels of visual sensors. This effect eliminates critical hyperspectral information making it challenging to distinguish different objects, but hyperspectral reconstruction is an approach used to partially recover such lost information. Such spectral projections are similar to autoencoders in the sense that they downsample the input to a low-dimensional space. In some cases, given a suitable algorithm that explores this space efficiently, it may be possible to retrieve sufficient data to reconstruct the initial input.

Sparse coding methods statically discover a set of basis vectors from HSI datasets known a priori. The K-SVD algorithm has been used to create overcomplete HSI and RGB dictionaries. The HSI is reconstructed by decomposing the input image into a linear combination of basis vectors, then transferred into the hyperspectral dictionary. One limit of sparse-coding methods is their applied matrix decomposition algorithms, which are vulnerable to outliers and show degraded performance. However, the capabilities of these methods have been extended through the use of deep learning and, in particular, with supervised learning, where a UNet-like architecture can be trained to predict HSI out of single RGB images. For instance, a radial basis function network has been trained to translate white-balanced RGB values to reflection spectra. As well, a two-stage reconstruction approach has been proposed comprising an interpolation-based upsampling method on RGB images. The end-to-end training proposed recovers true HSI from the upsampled images. Another approach uses different RGB cameras to acquire non-overlapping spectral information to reconstruct the HSI. These approaches reconstruct spectral information from highly non-linear prediction models, limited by their supervised learning structure. The models constrain data downsampling to non-optimal RGB images by applying a color generation function on HSI or generic RGB cameras. In contrast, the described embodiments avoid all the issues of the sparse coding and deep-learning reconstruction methods by performing spectral downsampling with optimally designed metasurface encoders or projectors.

Optical projectors in conventional cameras mimic the chromatic vision of humans based on three primary colors. However, the bandwidth range of human eyesight may not be sufficient or suitable for all real-world purposes. Therefore, the described embodiments expand the concept of RGB cameras from three channels to arbitrary low-dimensional sampling of reflectance spectra employing different variants of optimization routines, which converge to a set of optimal projectors from an initial number of candidates. The selected projectors thereby provide a multi-channel reconstruction of the HSI. It has also been demonstrated that a 1×1 convolution operation achieves similar functionality to optical projectors while processing multi-spectral data frames. The network is like an autoencoder, where the input HSI is downsampled and then reconstructed by a decoder network.

For the inverse design of metasurface projectors, optimizing best-fit filters is a dimensionality reduction problem, which involves finding the principal component directions that encode eigenvectors showing the lowest loss. Results are generated either from calculation or experimental measurement on thin-film filters, representing a rough approximation of the precise principal components. In hyperspectral imaging, these components typically exhibit frequency-dependent irregular patterns composed of complex distributions of sharp and broad resonances. Conventional metasurface design approaches usually rely on a library of pre-computed metasurface responses and polynomial fitting to further generalize the relationship between design parameters and the device performance. In at least some of the described embodiments, however, metasurface optical projectors can be designed using a hybrid inverse design approach that combines classical optimization and deep learning. In some additional embodiments, this hybrid inverse design approach can be further extended by adding differentiability, physical-model regularization, and complex decoder projectors able to tackle different computer vision tasks and perform thousands of parameter optimizations through the supervised end-to-end learning process.

Figure 1B:
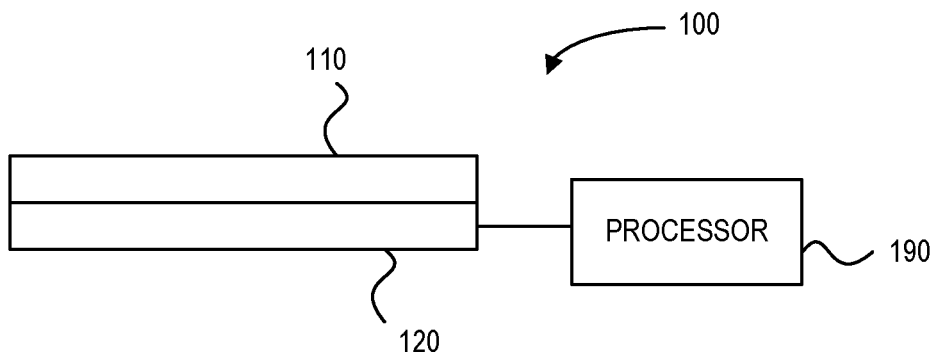
FIG. 1B is an elevation view of the imaging apparatus of FIG. 1A.
Figure 1C:
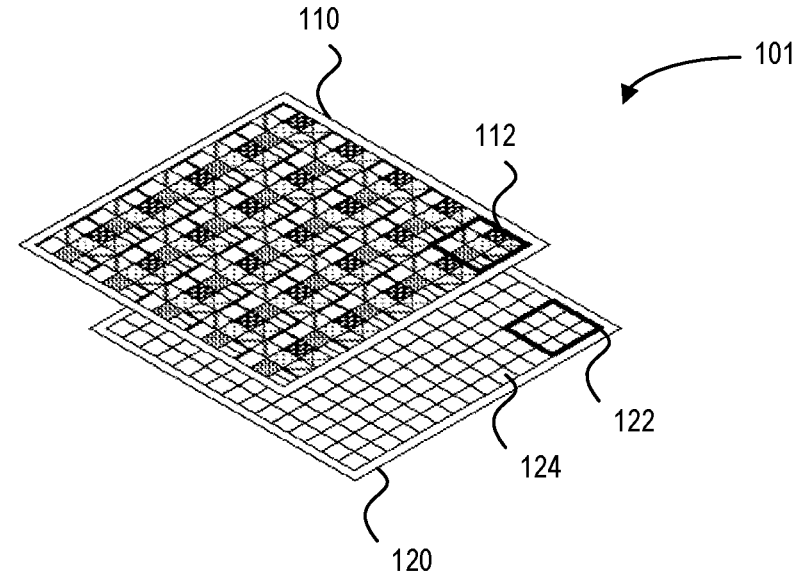
FIG. 1C is an exploded perspective view of the imaging apparatus of FIG. 1A.
Figure 1D:
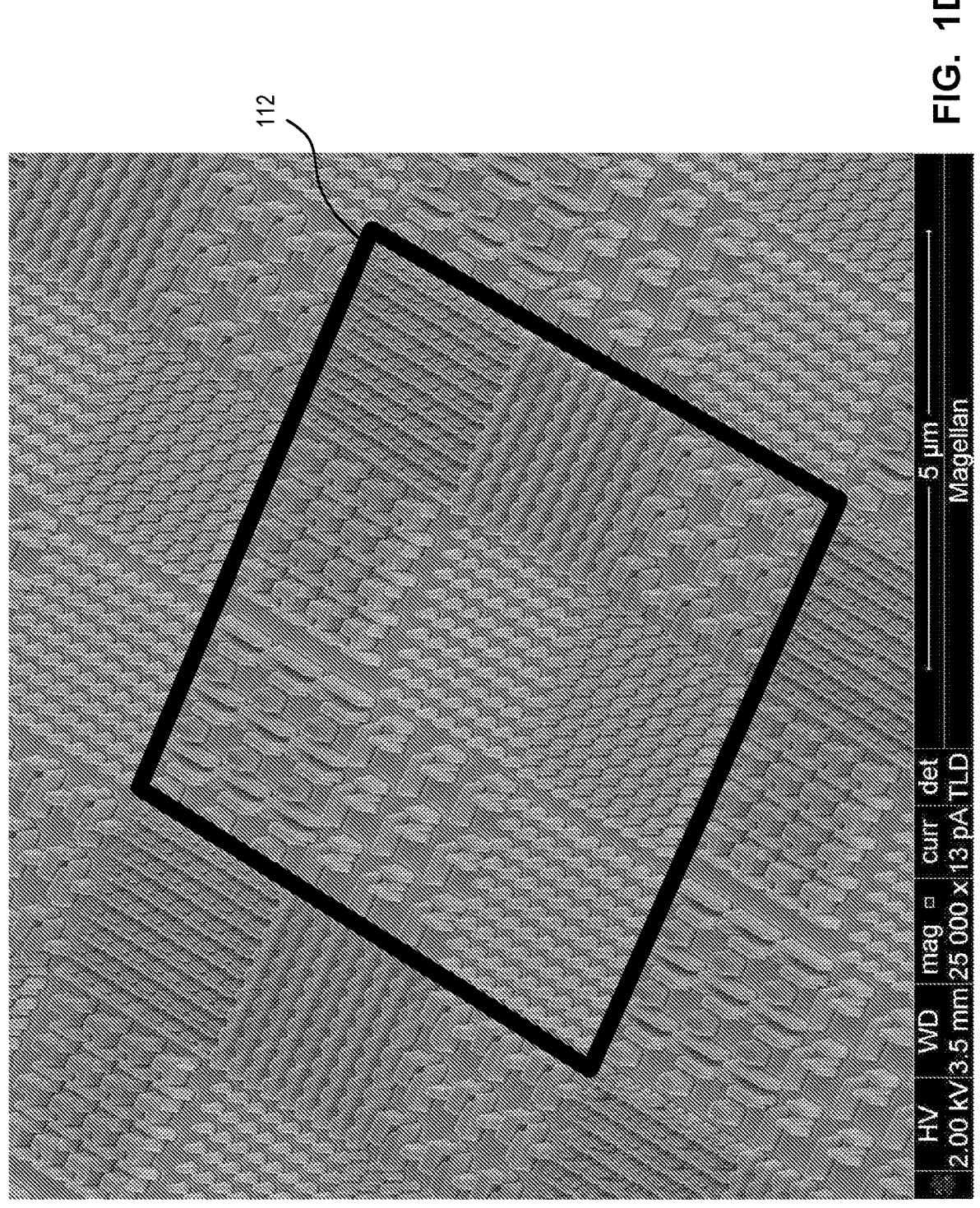
FIG. 1D is a scanning electron micrograph of an encoding sub-array in accordance with at least one embodiment.

Referring now in particular to FIGS. 1A to 1D, there is illustrated a hyperspectral imaging apparatus in accordance with at least one embodiment. Apparatus 100 has an imaging subsystem 101, coupled to a processor 190. Imaging subsystem 101 has an encoder layer 110 that is aligned with an imaging layer 120. FIG. 1A is a plan view of the imaging apparatus 100. FIG. 1B is an elevation view of the imaging apparatus, with the encoder layer 110 stacked atop the imaging layer 120. FIG. 1C is an exploded perspective view of the imaging subsystem. FIG. 1D is a scanning electron micrograph of an encoding sub-array 112 of an example encoder layer 110.

Encoder layer 110 has an i*j array of encoding sub-arrays 112, each encoding sub-array comprising an m*n array of spectral encoders 114, or projectors, having a plurality of respective transmission characteristics. The spectral encoders are flat optics and, in at least some embodiments, are formed out of patterned nanostructures designed to produce the respective transmission characteristic. In particular, the plurality of respective transmission characteristics are selected to encode a hyperspectral frequency range in a k-dimensional space, where k is m*n. In at least some embodiments, the transmission characteristics are linear for use with a linear operator. However, in some alternative embodiments, one or more transmission characteristics may be nonlinear for use with suitable non-linear operators.

In at least some embodiments, the transmission characteristics for each encoder within a sub-array are selected by iteratively minimizing a loss function while optimizing the transmission characteristic for an application.

In some other embodiments, the transmission characteristics for each encoder within a sub-array are selected by determining k principal components that encode eigenvectors with minimum loss for an application, and those k principal components can be determined by performing singular value decomposition.

Generally, each encoding sub-array 112 of the encoder layer 110 is aligned with a respective detecting sub-array 122 of the imaging layer 120. It follows that each encoder 114 is then aligned with a respective photodetector 124 such that there is a one-to-one correspondence between each encoder 114 of the encoder layer 110 and a respective photodetector 124 of the imaging layer 120. Together, each encoder of an encoding sub-array produces a "barcode" which is detected by the corresponding photodetectors of a detecting sub-array to produce an output "pixel". The precise size of the encoding and detecting sub-arrays may vary depending on the application. In some embodiments, the encoding and detecting sub-arrays (and the "barcode") have a 3×3 size. In other embodiments, the size may differ, such as for example 2×2, 4×3, 3×4, etc. Although this description provides rectangular examples of sub-arrays, the sub-arrays are not limited to rectangular geometries.

As noted, encoder layer 110 serves as an optical linear spectral encoder which, through the respective transmission characteristics of the spectral encoders, compresses an input high-dimensional HSI $\beta$ to a lower-dimensional multispectral image tensor $\hat{S}=\varepsilon(\beta)$ of transmission responses. The encoders may be fabricated, e.g., by patterning thin layers of amorphous silicon deposited on optical grade fused silica glass slides.

In at least one embodiment, the encoder layer is produced using 15 mm wide and 0.5 mm thick square pieces of fused silica glass as the substrate. Through plasma-enhanced vapor deposition, a thin layer of amorphous silicon is deposited on the glass, the thickness of which is controlled on each sample to match the design requirements. Further, 200 nm of a first resist (e.g., ZEP-520A from ZEON corporation) and 40 nm of a second resist (e.g., AR-PC 5090 from ALLRESIST) is spincoated and patterned into the shapes of the nanostructures using an electron beam lithography system with a 100 KV acceleration voltage. Next, the second resist is removed by submersing each sample for 60 s in deionized water. The devices are developed by submerging them in a solvent (e.g., ZED-50 from ZEON corporation) for 90 s and rinsing for 60 s in isopropyl alcohol. Further, 22 nm of chromium is deposited using electron beam evaporation to create a hard mask and perform liftoff followed by ultrasonic agitation for 1 min. Next, the unprotected silicon is removed using reactive ion etching, submerging the devices in an etchant (e.g., TechniEtch Cr01 from Microchemicals) for 30 s to remove the metal mask, and rinsing with deionized water to obtain the final device.

Other processes may also be used to produce the device. For example, it is possible to use only one resist, to vary the thicknesses of the resists (e.g., between 20 nm and 1000 nm. A different acceleration voltage of the electron beam lithography system (e.g., 50 kV) can be used. Solvents may be substituted with equivalents. Additionally, the metal mask can be omitted if an inverted version of the pattern is exposed in the resist or if a negative polarity resist is used and the etching is sufficiently optimized.

In some cases, UV lithography with a sufficiently high resolution can be used and can be suitable for mass production. In some other cases, nano imprint lithography may be used, or the silicon structures may be grown inside the holes of patterned resist.

Figure 6A:
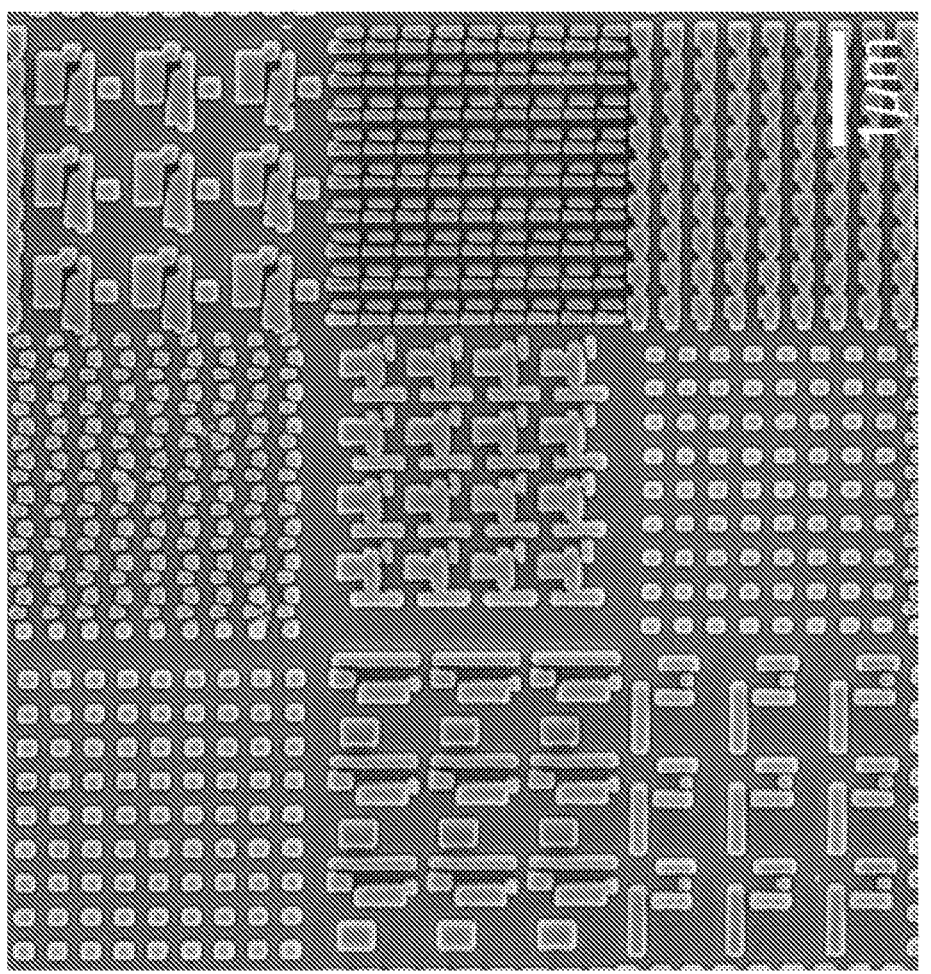
FIG. 6A is a scanning electron microscope (SEM) image of an example fabricated encoding sub-array.

FIG. 6A is a scanning electron microscope (SEM) image of an example fabricated encoding sub-array 600, detailing the nanoscale structure of each of nine encoders. In the illustrated example, each encoder of the 3×3 sub-array is arranged so that it occupies the area of a 2.4 μm wide square, a size typical for the photodetectors present in modern digital image sensors, which allows integration with an imaging layer 120. In the example, the optical response of each encoder is characterized using linearly polarized light with wavelengths from 400 nm to 1000 nm.

Referring again to FIGS. 1A to 1D, imaging layer 120 has an i*j array of detecting sub-arrays 122 aligned with the i*j array of encoding sub-arrays 112 of the encoder layer 110, each detecting sub-array 122 comprising an men array of photodetectors 124, each photodetector 124 is arranged to detect a respective transmission response of a respective spectral encoder 114 in response to broadband (e.g., encompassing visible, near-infrared, infrared up to mid-infrared, or ultraviolet, or any combination thereof) light. The imaging layer outputs an i*j array of pixel responses to a processor 190, each pixel response comprising a pixel vector of m*n transmission responses.

The processor 190 performs hyperspectral reconstruction to transform the tensor $\hat{S}$ of transmission responses into an HSI output, based on application-specific decoder mappings. In some cases, the processor 190 may also perform semantic segmentation of the resulting HSI.

In at least some of the embodiments described herein, the encoding layer is optical and acquires and encodes data generally at the speed of light. Therefore, data acquisition speed is primarily limited by the sensor frame rate (e.g., 30 frames per second (FPS)) and processing speed. For real-time classification/segmentation tasks, the remaining layers of the network will incur delays between the real-time processing of the hyperspectral images and the output for the task. One approach to achieve real-time processing is to use a shallow network implemented in a graphics processing unit (GPU). In one example embodiment, the specifications of the dataset used in training were matched and the system was designed to work from 400 nm to 700 nm with 10 nm spectral resolution and 512×512 spatial resolution. In general, a spectral resolution better than 2 nm can be achieved, covering the wavelength range from 400 nm to 700 nm. Using a high-resolution imaging sensor currently commercially available (e.g., 12 megapixel or better resolution), a hyperspectral imaging apparatus with resolution over 2 megapixels and an acquisition speed of close to 1 Tb/s can be achieved.

Figure 2:
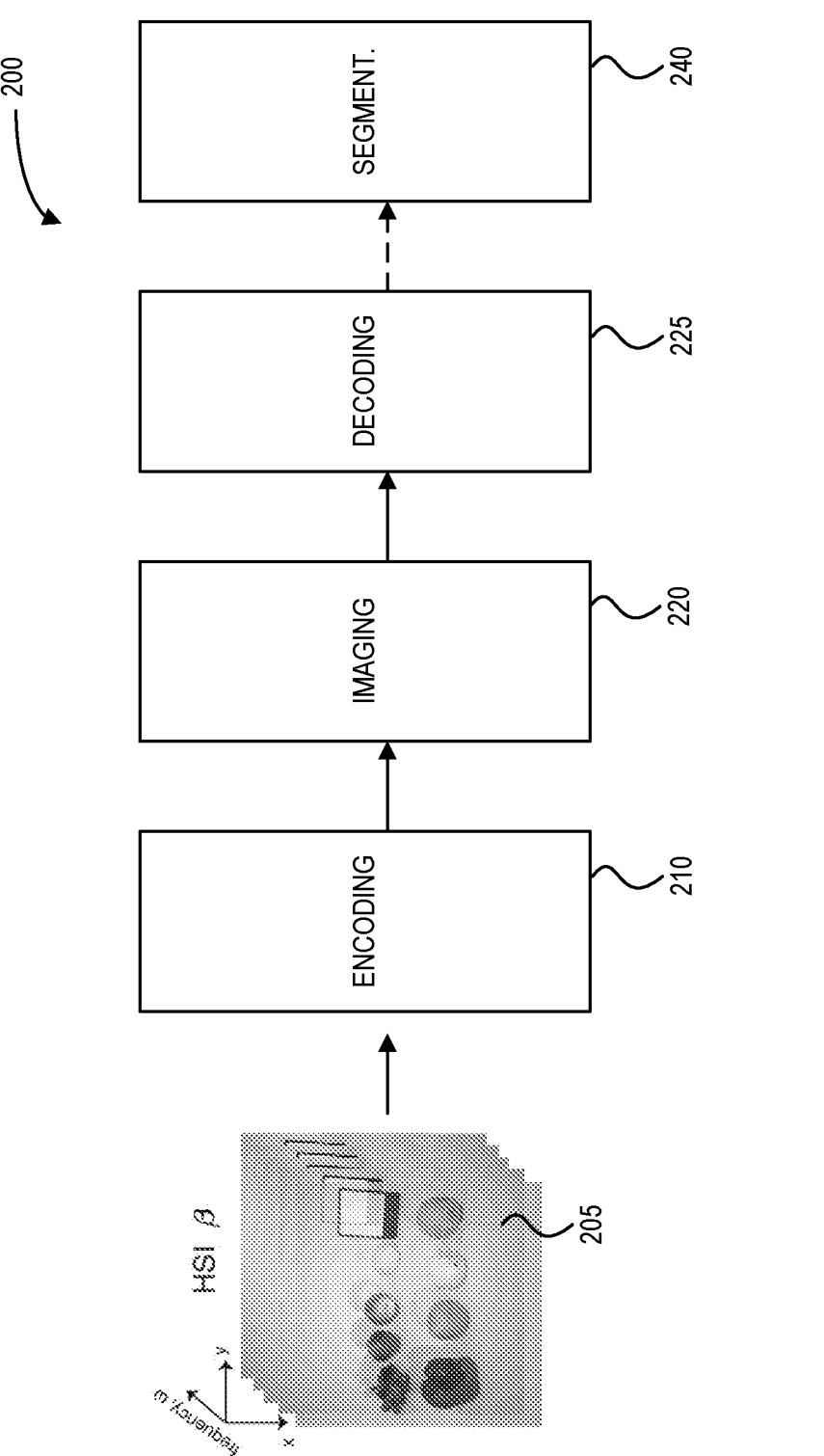
FIG. 2 is a flow chart diagram of an example method of hyperspectral imaging in accordance with at least one embodiment.

Referring now to FIG. 2, there is illustrated a flow chart diagram of an example method of hyperspectral imaging. Method 200 may be carried out by an encoder layer, imaging layer and processor such as, for example, those of apparatus 100. As described, the encoder layer has an i*j array of encoding sub-arrays, each encoding sub-array comprising an m*n array of spectral encoders having a plurality of respective transmission characteristics, the plurality of respective transmission characteristics selected to encode a hyperspectral frequency range in a k-dimensional space, where k is m*n. The imaging layer has an i*j array of detecting sub-arrays aligned with the i*j array of encoding sub-arrays of the encoder layer, each detecting sub-array comprising an m*n array of photodetectors.

Method 200 begins at 210 with exposing the encoder layer, such as encoder layer 110 of apparatus 100, to broadband light from a hyperspectral scene, and the encoder layer encoding the light according to the transmission characteristics of the encoders within each encoding sub-layer, as described herein, to produce a plurality of transmission responses.

At 220, each photodetector of the imaging layer, such as imaging layer 120 of apparatus 100, detects a respective transmission response of a respective spectral encoder in response to the broadband light. The imaging layer then outputs an i*j array of pixel responses from the imaging layer, each pixel response comprising a pixel vector of m*n transmission responses.

At 225, a processor, such as processor 190 of apparatus 100, decodes the i*j array of pixel responses into a corresponding i*j array of pixel spectra to produce an output hyperspectral image encompassing the hyperspectral frequency range.

Optionally, at 240, the processor may perform semantic segmentation based on the output hyperspectral image, as described further herein.

Hyperspectral reconstruction serves to reconstruct the input HSI, or its tensor, with minimum loss. Loss may be defined via the Root Mean Squared Error (RMSE) $\hat{\beta}=\mathcal{D}_{rec}(\varepsilon(\beta))$ of HSI. Accordingly, a decoder used may be the decoder $\mathcal{D}_{seg}$ using the U-Net architecture, with adjusted input and output layers to meet the dimensionality of the HSI tensor. The decoder outputs softmax logits $\hat{y}$, representing the probability of observing each pixel ground-truth label y. These predictions can be assessed quantitatively by using the cross-entropy loss function $\mathcal{L}_{seg}$.

In the encoder layer, the transfer function of an array of sub-micron nanostructured geometries can approximate arbitrarily defined continuous functions. The described embodiments use this universal approximation ability to design and implement an optimal linear spectral encoder hardware for application-specific hyperspectral information-related imaging tasks.

Figure 3A:
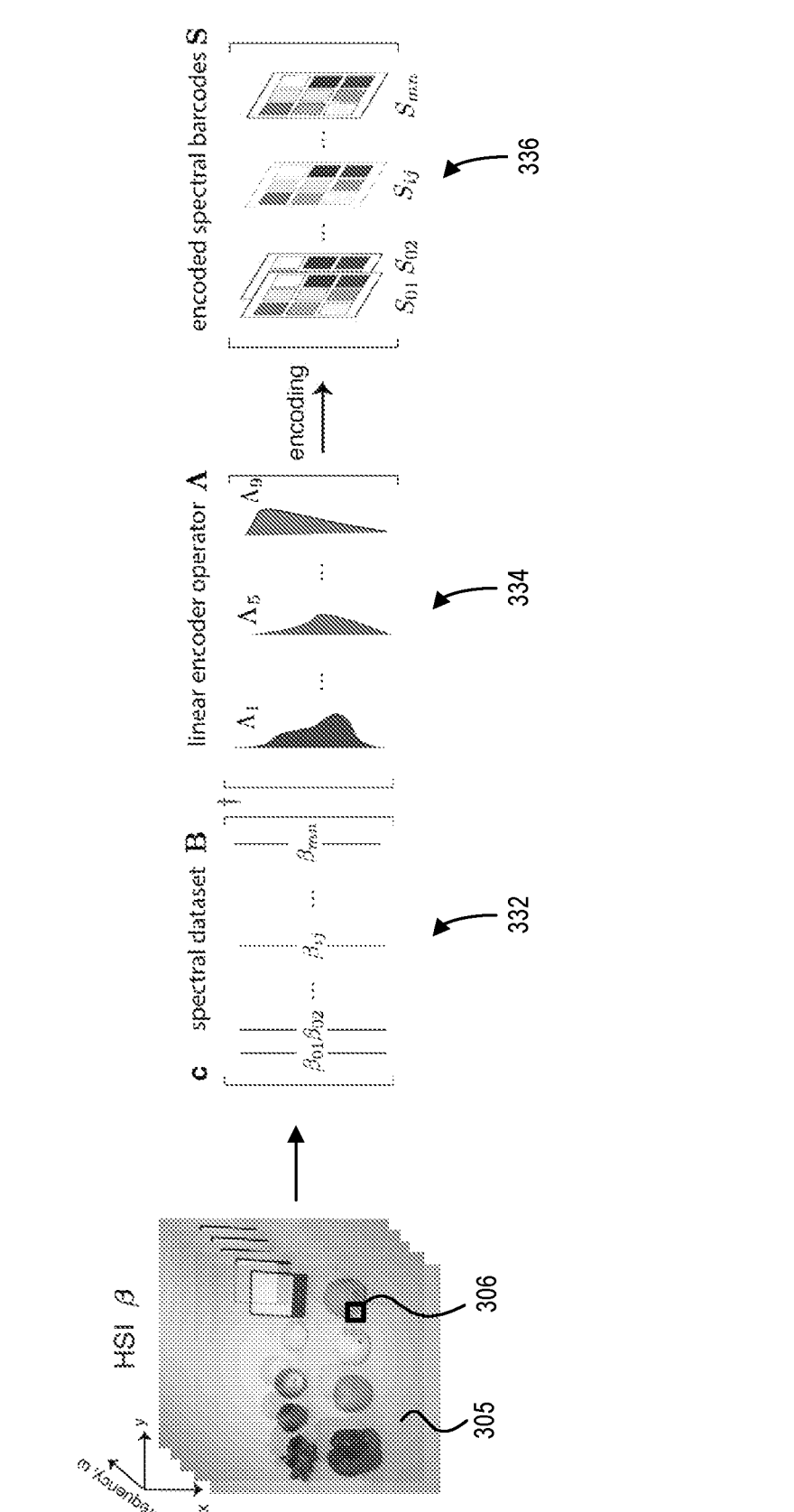
FIG. 3A is a flow chart diagram for a hyperspectral imaging method in accordance with at least one embodiment.
Figure 3B:
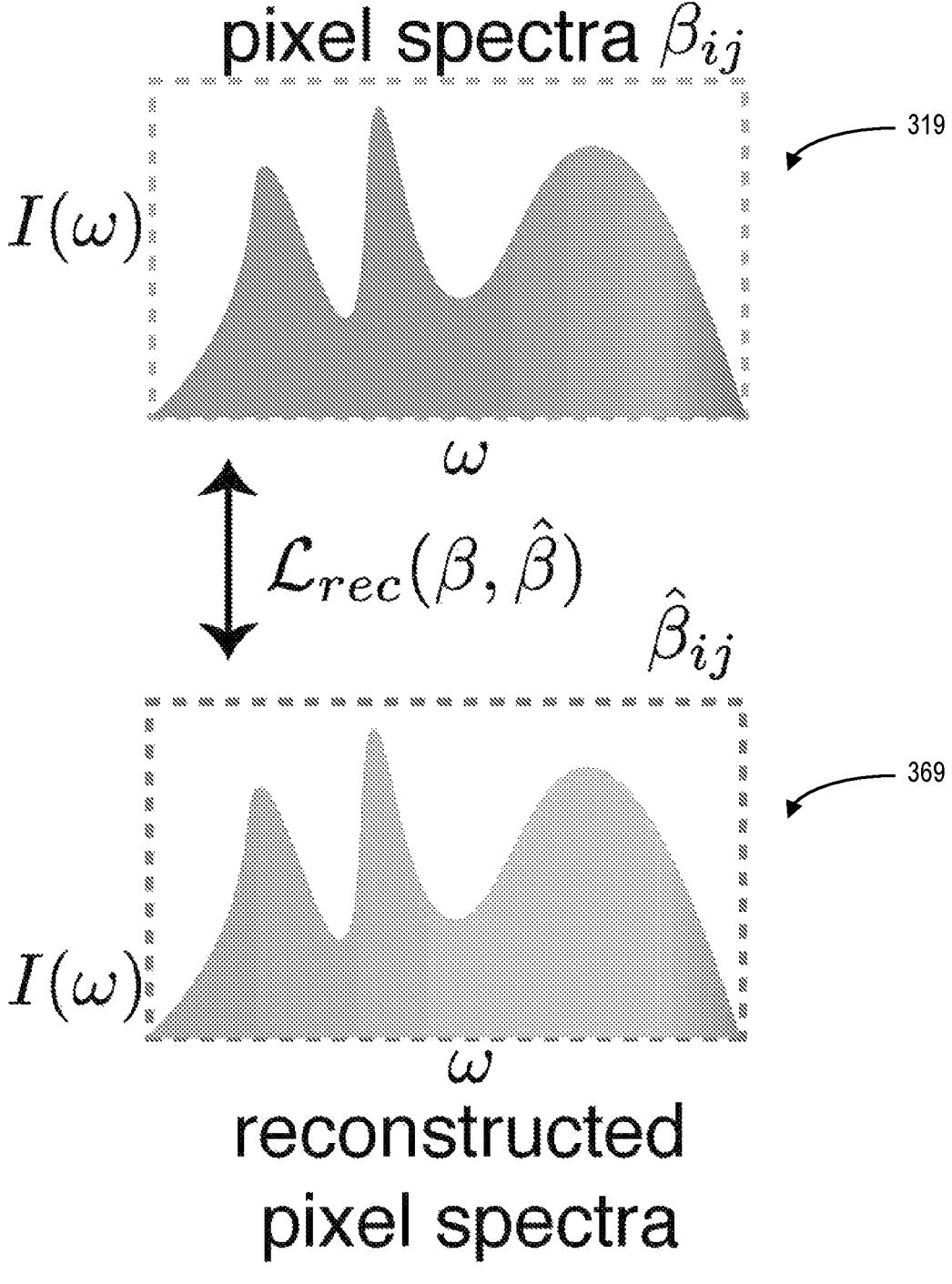
FIG. 3B is a chart illustrating an example power density spectra as measured and reconstructed in accordance with at least one embodiment.

Referring now to FIG. 3A, there is illustrated data work-flow for a hyperspectral imaging method in accordance with at least one embodiment. The workflow is shown for a generic linear encoder operator $\varepsilon=\hat{\Lambda}^{\dagger}$. A hyperspectral image 305 may be represented as a tensor $\beta$ with three dimensions: two spatial dimensions (x, y), corresponding to the camera virtual image plane, and one frequency axis $\omega$, measuring the power density spectra 319 (as shown in FIG. 3B), retrieved as a pixel response at one imaging layer pixel 306.

A linear dimensionality reduction operator $\Lambda$ is obtained that finds a new equivalent encoded representation of $\beta$. The hyperspectral tensor of a dataset of images is flattened to a matrix B that contains, on each column, the power density spectra of a set of pixels. The linear encoding $\Lambda^{\dagger}$ is then applied to obtain an approximation of B via a set of linear projectors $\Lambda(\omega)$, which map pixel-by-pixel the spectral coordinate $\beta_{ij}$ to a set of scalar coefficients $S_{ijk}$:

$$S_{ij} = \bar{\Lambda}(\omega)\beta_{ij}(\omega), \qquad S_{ij} = \int \Lambda_k(\omega)\beta_{ij}(\omega)d\omega \qquad (1)$$

The spectral information contained in $\beta_{ij}(\omega)$ is embedded into an equivalent "barcode" $S_{ijk}$ of a few components. To implement the A encoder layer into hardware, two different approaches may be used.

In one approach, when the user end task does not impose additional constraints, such as in, e.g., spectral reconstruction, the encoders may be designed by utilizing optimization frameworks, such as principal component analysis (PCA) with the described hybrid inverse design approach to minimize the norm between the physical metasurface response $\hat{\Lambda}$ and the target $\Lambda$:

$$\operatorname{argmin}\|\Lambda - \hat{\Lambda}(L)\|_2$$

Alternatively, in tasks that may impose further conditions such as, e.g., hyperspectral semantic segmentation, a learnable backbone may be used, which uses the described differentiable hybrid inverse design approach, which creates a differentiable physical model that is trained with an end-to-end approach. The differentiable hybrid inverse design approach designs metasurface geometries through an iterative process that minimizes the loss function $\mathcal{L}_{seg}$ by optimizing simultaneously the projector responses $\Lambda$ and the vector L containing all the parameters defining the metasurface:

$$L^i = L^{i-1} - \gamma \frac{\partial \mathcal{L}}{\partial \mathcal{D}} \frac{\partial \mathcal{D}}{\partial \Lambda} \frac{\partial \Lambda}{\partial L}$$

As described above, a single imaging sub-array, or "pixel," response integrates the transmission response from multiple encoders or metasurface projectors (i.e., of an encoding sub-array) in a two-dimensional sub-array of encoders (or "sub-pixels"), which are replicated in space to form the encoder layer. Each encoding sub-array transforms a reflection spectra arising from a scene into a "barcode" $\hat{S}_{ij}$, composed of a set of intensity signals proportional to the overlap between the input spectra and each projector's response as defined in Equation (1). Photodetectors of a CMOS or CCD imaging layer, placed behind the metasurfaces, act as an imaging readout layer. Each individual photodetector of the imaging layer matches corresponding respective "sub-pixels" of the encoder layer and thus retrieves one intensity signal of the barcode $\hat{S}_{ij}$ (an example of which is shown as spectra 369 in FIG. 3B). Thus, the group of photodetectors within a detecting sub-array can detect the entire "barcode" and produce a "pixel" output, in a manner generally analogous to the subpixels of an RGB image sensor, which may include four photodetectors positioned behind a Bayer filter (e.g., BGGR, RGBG, GRBG, etc.) to produce a single colour value for each "pixel."

In the PCA hybrid inverse design approach, a linear encoder $\Lambda$ is obtained through an unsupervised learning technique using principal component analysis (PCA). PCA performs hardware encoding $\varepsilon$ by selecting the k strongest (e.g., k=9) principal components $\hat{\Lambda}^{\dagger}$ from the singular value decomposition of $B=\Lambda\Sigma V^{\dagger}$, and approximating B as follows:

$$B = \bar{\Lambda}\sum \bar{V}^{\dagger} \qquad (2)$$

Equation (2) offers the closest linear approximation of B in the least square sense. The decoder $\mathcal{D}$ is implemented with the linear projector $\hat{\beta}_{ij}=\hat{\Lambda}_{ij}\hat{S}_{ij}$, which recovers the best least square approximation of the pixel spectra (e.g., spectra 369) $\hat{\beta}_{ij}(\omega)\approx\beta_{ij}(\omega)$ from the selected PCA component.

The particular linear operator chosen can be tuned for particular applications.

In some embodiments, linear encoders other than PCA can be used, such as, for example, JPEG compression.

In still other embodiments, nonlinear encoders may be used if the metasurfaces are produced from materials with a nonlinear transmission characteristic.

In the differentiable hybrid inverse design approach, the decoder operator $\mathcal{D}$ is represented as a set of hierarchical nonlinear operators $\mathcal{F}$, which project the input tensor $\hat{S}$ into an output measurement tensor $\hat{y}$. This process is iteratively trained via supervised learning, comparing the measurement $\hat{y}$ with some ground-truth tensor $\tilde{y}$. This end-to-end training finds the optimal feature space $\tilde{S}$ and the associated linear projectors $\Lambda$. To perform training in this approach with backpropagation, the encoder $\varepsilon$ is differentiable.

In the inverse-design of projectors, the encoder $\varepsilon$=H, with H($\omega$) representing the output transmission function of the metasurface response, which is obtained from the solution of the following set of coupled-mode equations:

$$\begin{cases} \tilde{a}(\omega) = \cfrac{\tilde{K}}{i(\omega - W) + \cfrac{\tilde{K}\tilde{K}^{\dagger}}{2}} \tilde{s}_{+} \\ \tilde{s}_{-}(\omega) = \tilde{C}(\omega) \cdot \left( \tilde{s}_{+} - \tilde{K}^{\dagger} \cdot \tilde{a} \right) \end{cases} \quad (3)$$

where W is a diagonal matrix with resonant frequencies $\omega_n$ of the modes $W_{nn} = \omega_n$, $\tilde{C}(\omega)$ is a scattering matrix modeling the scattering of impinging waves $\tilde{s}_+$ on the resonator space, and $\tilde{K}$ is a coupling matrix representing the interaction between traveling waves $\tilde{s}_\pm(t)$ and resonator modes $\tilde{a}$ (t). Equations (3) describe the dynamics of a network of resonator modes $\tilde{a} = [\tilde{a}_1(\omega), \ldots, \tilde{a}_n(\omega)]$, interacting with $\tilde{s}_\pm = [\tilde{s}_{1\pm}(\omega), \ldots, \tilde{s}_{m\pm}(\omega)]$ incoming (+) and reflected (−) waves.

This approach is based on time-domain coupled-mode theory (TDCMT), which uses a set of exact coupled-mode equations that are equivalent to Maxwell's equations. The principle of the coupled-mode approach is to divide the geometrical space $\Omega$ of light propagation into a resonator space $\Omega_r$ and an external space $\Omega_e$. It is assumed that the external space does not contain sources or charges. Under this formulation, the set of Maxwell equations reduces to Equations (3), with $1/\tilde{X}$ the inverse matrix $\tilde{X}^{-1}$. Power conservation implies that the matrix $\sigma$:

$$\sigma = 1 - \tilde{K} \cfrac{1}{i(\omega - W) + \cfrac{\tilde{K}\tilde{K}^{\dagger}}{2}} \tilde{K}^{\dagger} \quad (4)$$

defined from the solution of the coupled mode equations, is unitary $\sigma^{\dagger} \cdot \sigma = 1$.

Equations (3) illustrate that the dynamics of the system depend only on three independent matrices: the coupling matrix $\tilde{K}$, the scattering matrix $\tilde{C}$, and the resonance matrix W.

The input-output transfer function $H = \tilde{s}_-/\tilde{s}_+$ resulting from the solution of Equations (3) is the superposition of two main terms: a propagation term defined by the scattering matrix $\tilde{C}(\omega)$ and a nonlinear term containing the rational function $$\frac{\tilde{K}}{\sigma(\omega - W)}.$$

Equation (3) represents a differentiable function of W through which it is possible to backpropagate.

Figure 4A:
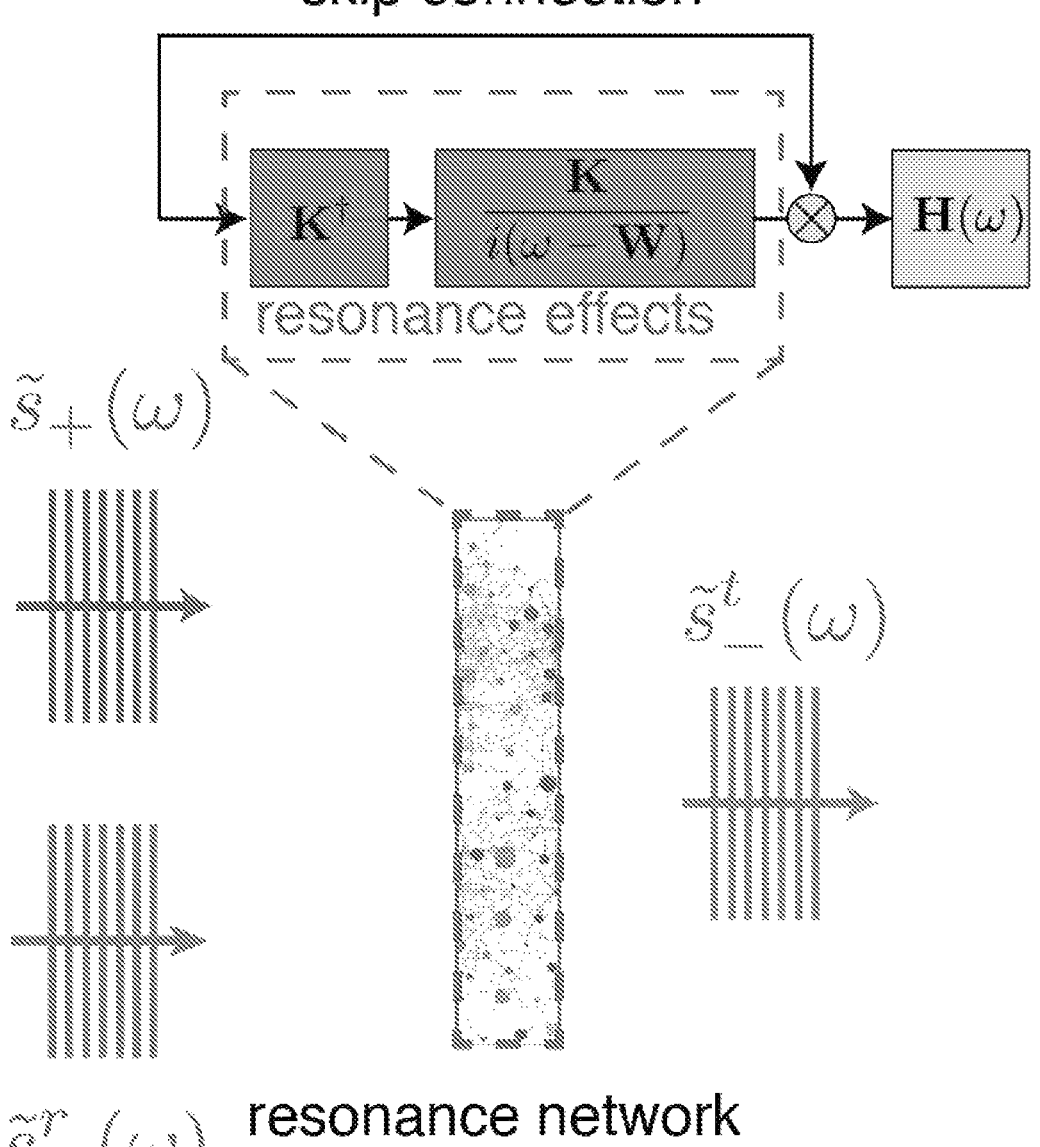
FIG. 4A is a schematic diagram illustrating a coupled-mode photonic network as a feedback-loop with skip connection.
Figures 4B, 4C:
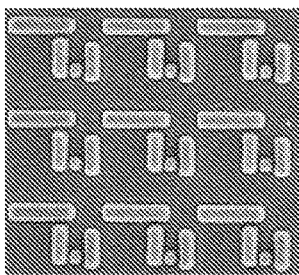
FIG. 4B is a schematic diagram that illustrates a trainable coupled resonance layer.
FIG. 4C is a micrograph illustrating parametric geometry shapes generated using trained differentiable projections in accordance with at least one embodiment.

FIGS. 4A to 4C illustrate an example of the coupled mode network as a differentiable metasurface physical model. FIG. 4A is a schematic diagram that illustrates the resonance and propagation effect when light passes through a metasurface encoder. As shown in FIG. 4A, the physical model derived from coupled-mode theory shares a common architecture with a skip-connection neural network. FIG. 4B is a schematic diagram that illustrates a trainable coupled resonance layer. FIG. 4C is a scanning electron microscope (SEM) image of a trained resonance layer. The optimized geometry shapes will form the functionality of the metasurface encoder as described above.

In some embodiments, using the differentiable hybrid inverse design approach, to project the resonator quantities in Equations (3) to metasurface input parameters L, a supervised optimization process can be used. A deep neural network is trained to learn the relationship between L and the resonator variables in Equations (3). Following the same approach described herein, the network is trained with a supervised spectral prediction task by using arrays of silicon boxes with simulated transmission/reflection responses.

Figures 8A, 8B:
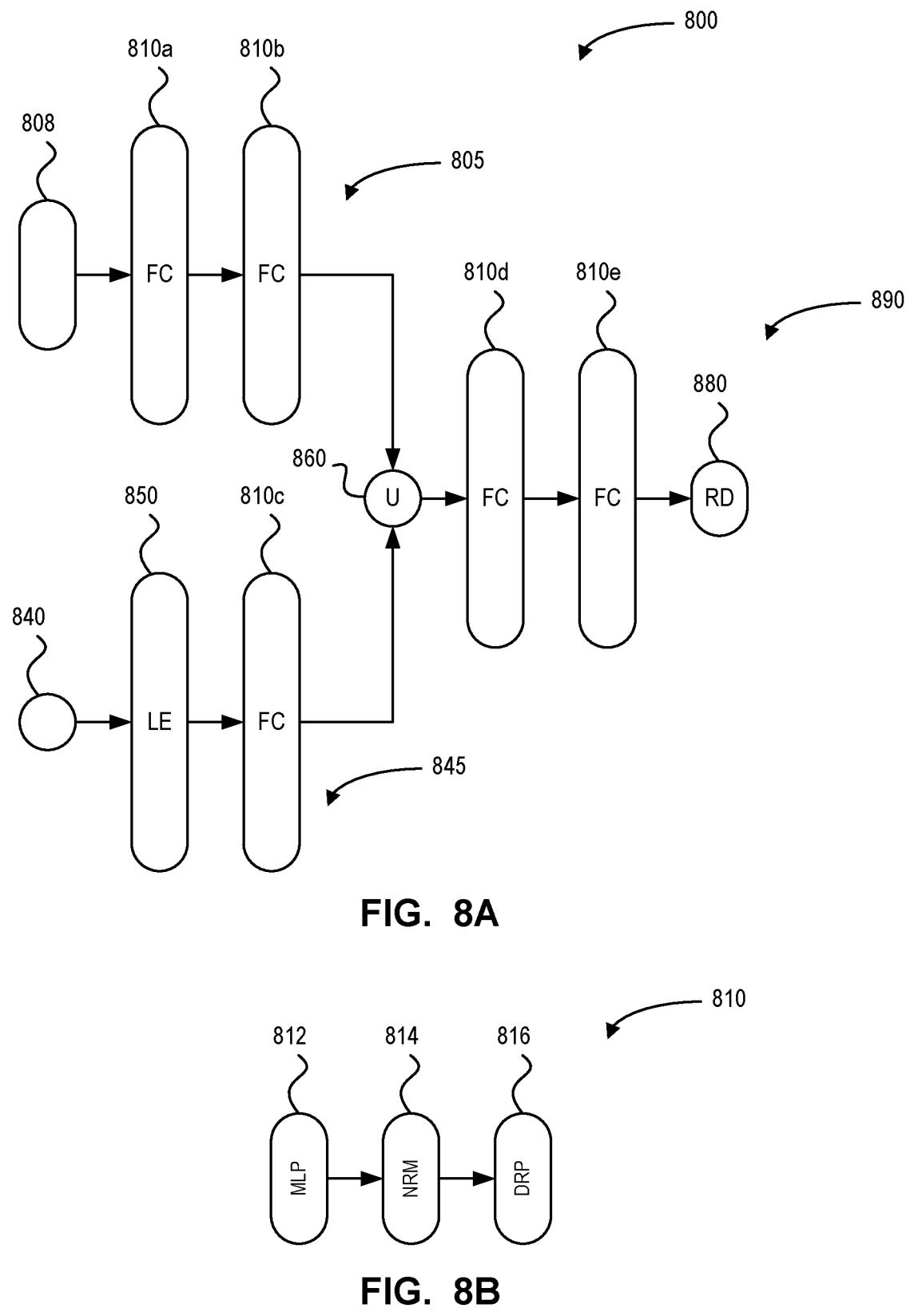

FIG. 8A illustrates an example model of the differentiable hybrid inverse design predictor 800, which has a first branch 805 with continuous input 808 and several fully connected (FC) blocks 810a and 810b connected sequentially. Each FC block 810 (shown in FIG. 8B) consists of multi-layer perceptrons 812 (MLP) of different sizes, a batch normalization layer 814, and dropout 816. To process categorical input variables (e.g., period, thickness) separately, a second branch 845 is provided consisting of a categorical input 840, linear embedding layer 850 and FC block 810c connected sequentially. The primary purpose of branch 845 is to balance categorical and continuous variable weights in the model. Then both continuous branch 805 and categorical branch 845 are concatenated at block 860 and fed into readout branch 890, consisting of multiple FC blocks 810d, 810e and non-linear readout 880.

In one example, a training dataset, e.g., containing over 600 000 simulation results of pure silicon structures on top of glass under a Total-Field Scattered-Field (TFSF) simulation can be used. In this example, each simulation has periodic boundary conditions with one of the three different periods (250 nm, 500 nm or 750 nm) and one of the ten different discrete thicknesses from 50 to 300 nm with a 25 nm step. Each structure consists of a random combination (up to 5) of cuboid resonators. The dataset is split into test and training parts comprising 20% and 80% of the total, respectively, then 10% of the training set is used as a validation set.

For the training part, an Adam optimizer can be used, e.g., with a learning rate $1 \times 10$-5 and a step learning rate scheduler with stepsize=50 and y=0.1 hyperparameters. To achieve a desired system response in either transmission or reflection, a sigmoid activation function is applied at the top layer of the FCN. This function maps the output spectrum to the range [0,1], which aids in convergence at the beginning of the training stage. Due to the use of periodic boundary conditions, random translation and rotations may be used for data augmentation.

Figure 8C:
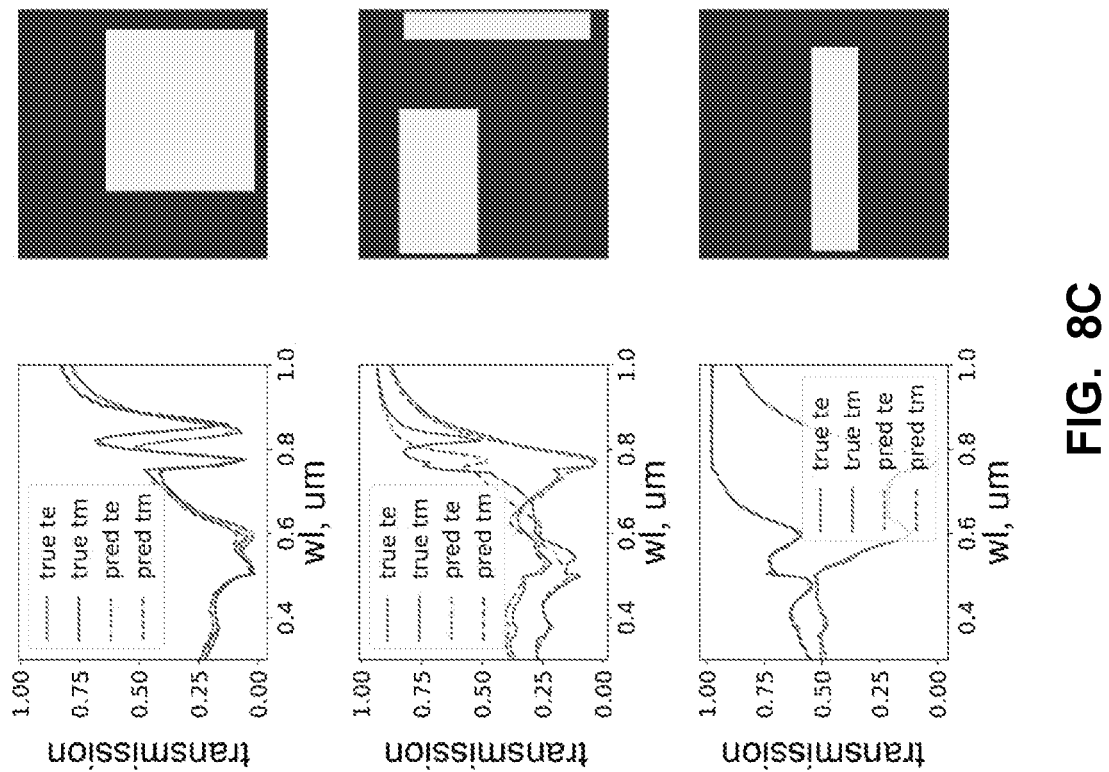
FIG. 8C is a series of charts illustrating three qualitative comparisons between trained and ground truth spectral responses for sample metasurfaces.

Using this approach, a validation mean squared error of 0.008 is achieved. FIG. 8C provides a qualitative comparison between trained and ground truth spectral responses.

Figure 9:
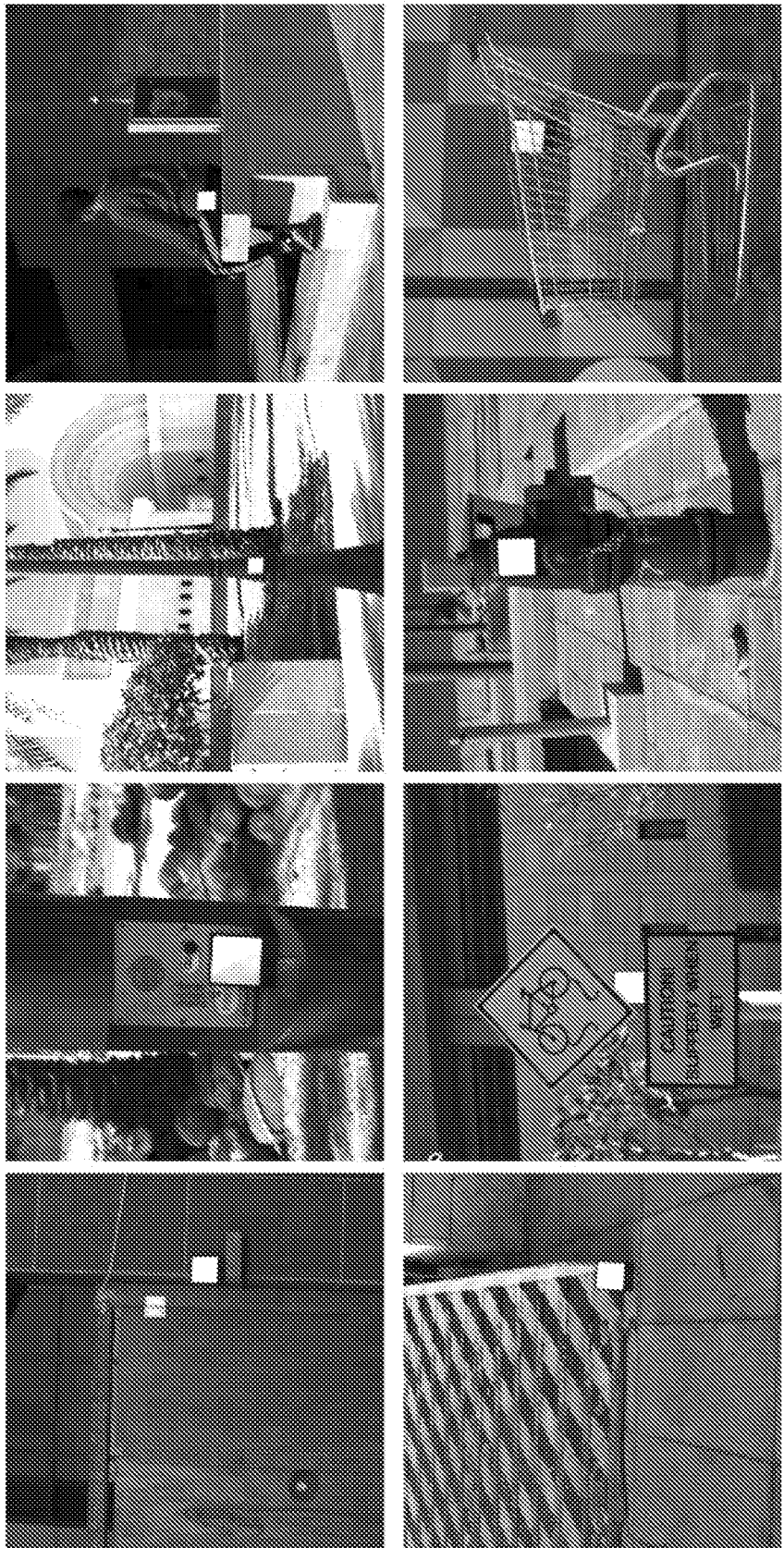
FIG. 9 is a table of images that is used to augment a dataset.

The described embodiments may be trained and validated using a variety of datasets. In some embodiments, three publicly available datasets can be used: the CAVE dataset (available at https://www1.cs.columbia.edu/CAVE/databases/multispectral/), consisting of 32 indoor images covering 400 nm to 700 nm, and the Harvard and KAUST datasets (available at http://vision.seas.harvard.edu/hyperspec/and https://repository.kaust.edu.sa/handle/10754/670368, respectively), which contain both indoor and outdoor scenes, and amount to 75 and 409 images, respectively, with spectral bands covering 420 nm to 720 nm and 400 nm to 700 nm respectively. An additional hyperspectral dataset FVgNET can also be used (available at https://github.com/makamoa/hyplex). FVgNET is comprised of 317 scenes showing fruits and vegetables, both natural and artificial, taken indoors under controlled lighting conditions, and covering the 400 nm to 1000 nm range. Approximately 40% of the scenes consist of a single row of objects located at the camera's focal plane. The remaining scenes show two rows of objects, with the focal plane located in between. A white reference panel is approximately constant throughout the dataset for ease of normalization. The hyperspectral images have a spatial resolution of 512×512 pixels and 204 spectral bands. An RGB image is also provided as seen through the lens of an RGB camera for each scene with the same spatial resolution. In some cases, to validate generalization ability the dataset may be augmented with, e.g., 20 additional images (examples of which are shown in FIG. 9). The resulting re-construction error for these example images is 2.54±2.72, a value consistent with the results obtained with the KAUST dataset used to train the encoder.

The FVgNET images were acquired using a setup consisting of a white paper sheet arranged in an infinity curve, a configuration employed in photography to isolate objects from the background. This achieves good spectral coverage while minimizing the presence of shadows in the final images by illuminating the objects with overhead white LED indoor lighting, a 150 W halogen lamp (OSL2 from Thorlabs) equipped with a glass diffuser and a 100 W tungsten bulb mounted in a diffuse reflector.

Referring now to FIGS. 5A and 5B, there are shown charts illustrating the distribution of object classes in the FVgNET dataset. For each class of objects (e.g., apple, orange, pepper), an approximately equal number of scenes is generated showing: a) natural objects only and b) artificial objects only. The dataset consists of 12 classes, represented in the images proportionally to their chromatic variety. Furthermore, 80% of the images are annotated with additional segmentation masks. Each class has a roughly equal number of instances in the dataset with the exception of apples and peppers, as they have more chromatic variety. The semantic segmentation masks are incorporated into the dataset by processing the RGB images generated from the 204 spectral channels. The images are acquired in such a way as to avoid the intersection of objects, allowing for automatic generation of masks for the areas occupied by each object. Each marked object was then annotated, identifying each object class and whether they are natural or artificial.

FIG. 5C illustrates the implementation of the semantic segmentation mask (labels) on an image of the dataset. At left is the RGB visualization of a hyperspectral image. At right are the segmentation masks and labels for each object.

Figure 6B:
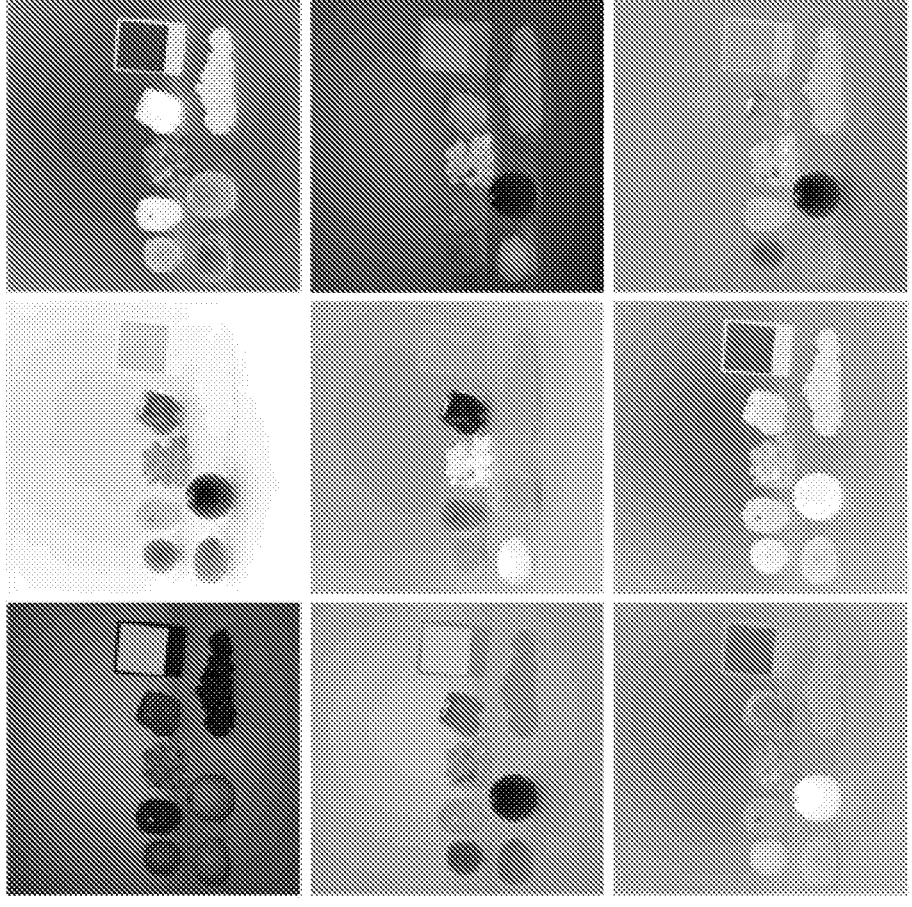
FIG. 6B is a simulated raster image of a scene from the FVgNET dataset as perceived through the encoders of the encoding sub-array of FIG. 6A.
Figures 6C, 6D:
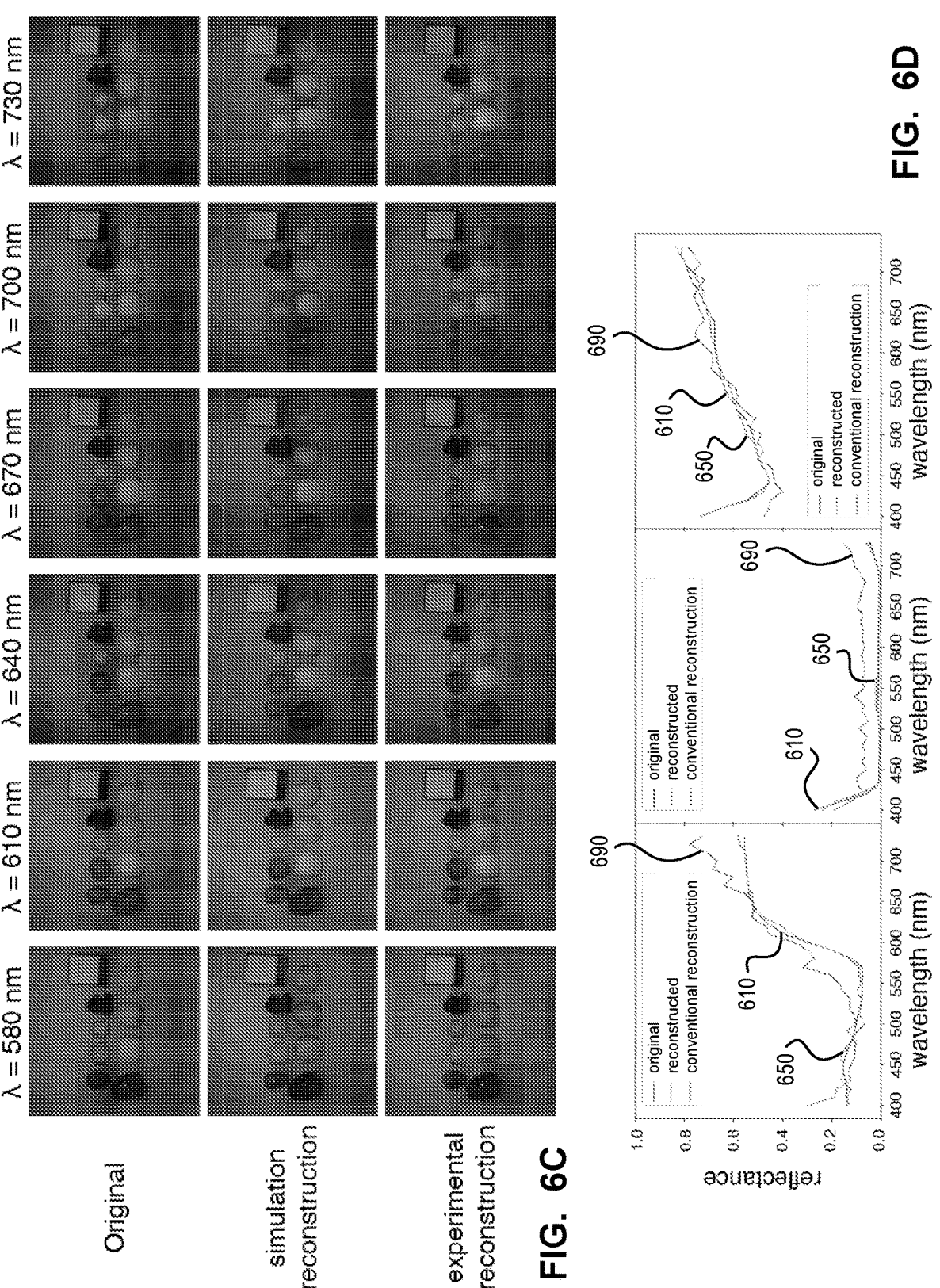
FIG. 6C is a table of images illustrating a qualitative comparison between the hyperspectral reconstruction of the scene of FIG. 6B.
FIG. 6D is a table of line charters illustrating a quantitative comparison.

Referring now to FIG. 6B, there is illustrated a scene from the FVgNET dataset as perceived through each of the encoders of an encoding layer comprised of encoding sub-arrays 600, based on example data. FIG. 6C illustrates a qualitative comparison between the hyperspectral reconstruction of this scene based on both the simulated and example barcodes against the original. FIG. 6D illustrates a quantitative comparison between the original spectra 610, reconstructed spectra 650 according to an example embodiment, and reconstructed spectra 690 according to a conventional approach. 80% of the dataset was designated for training the decoder and the remainder for validation purposes.

Figure 7:
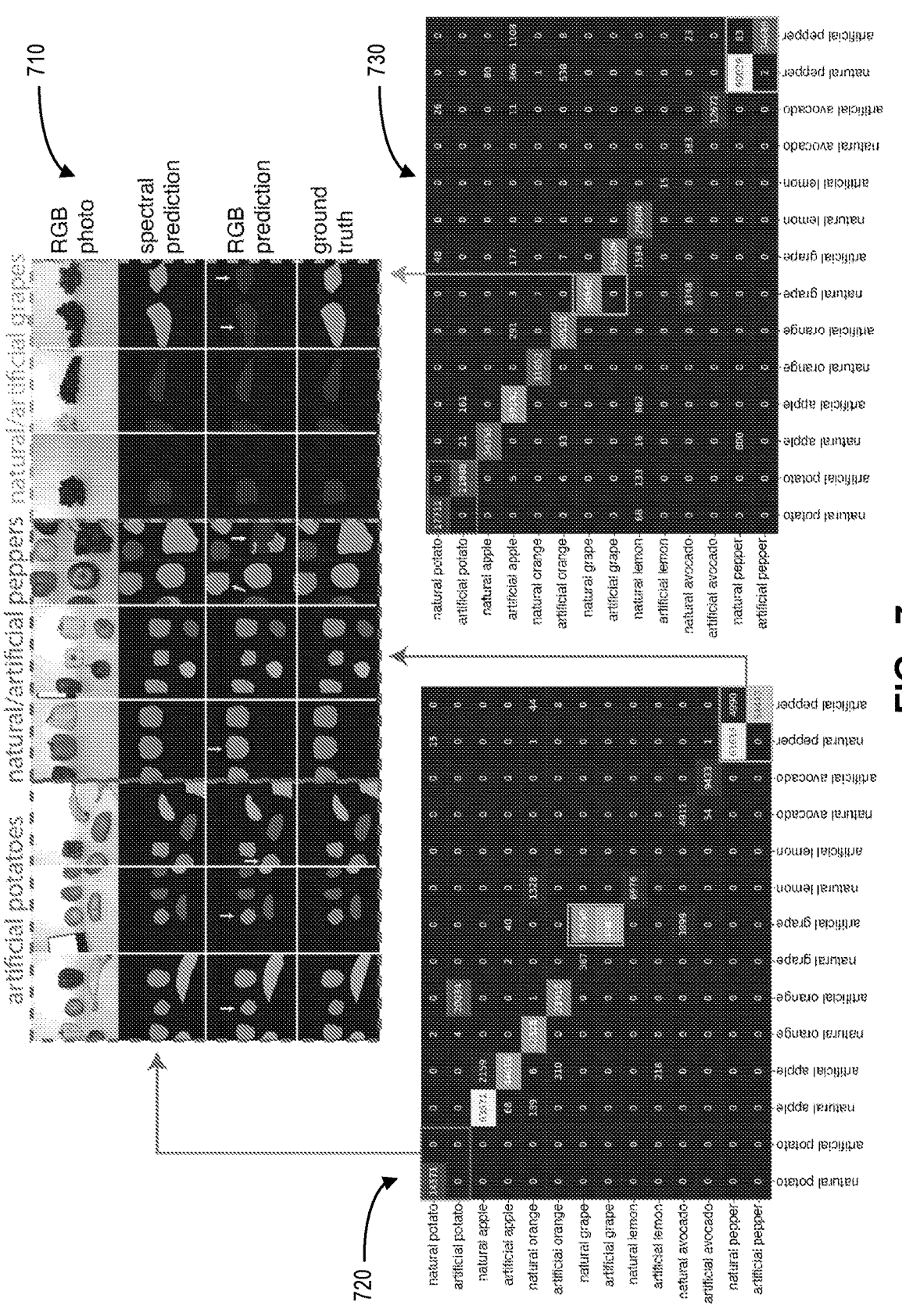
FIGS. 7A to 7C are tables illustrating a comparison between spectral and RGB-based semantic segmentations.
Figures 10A, 10B, 10C:
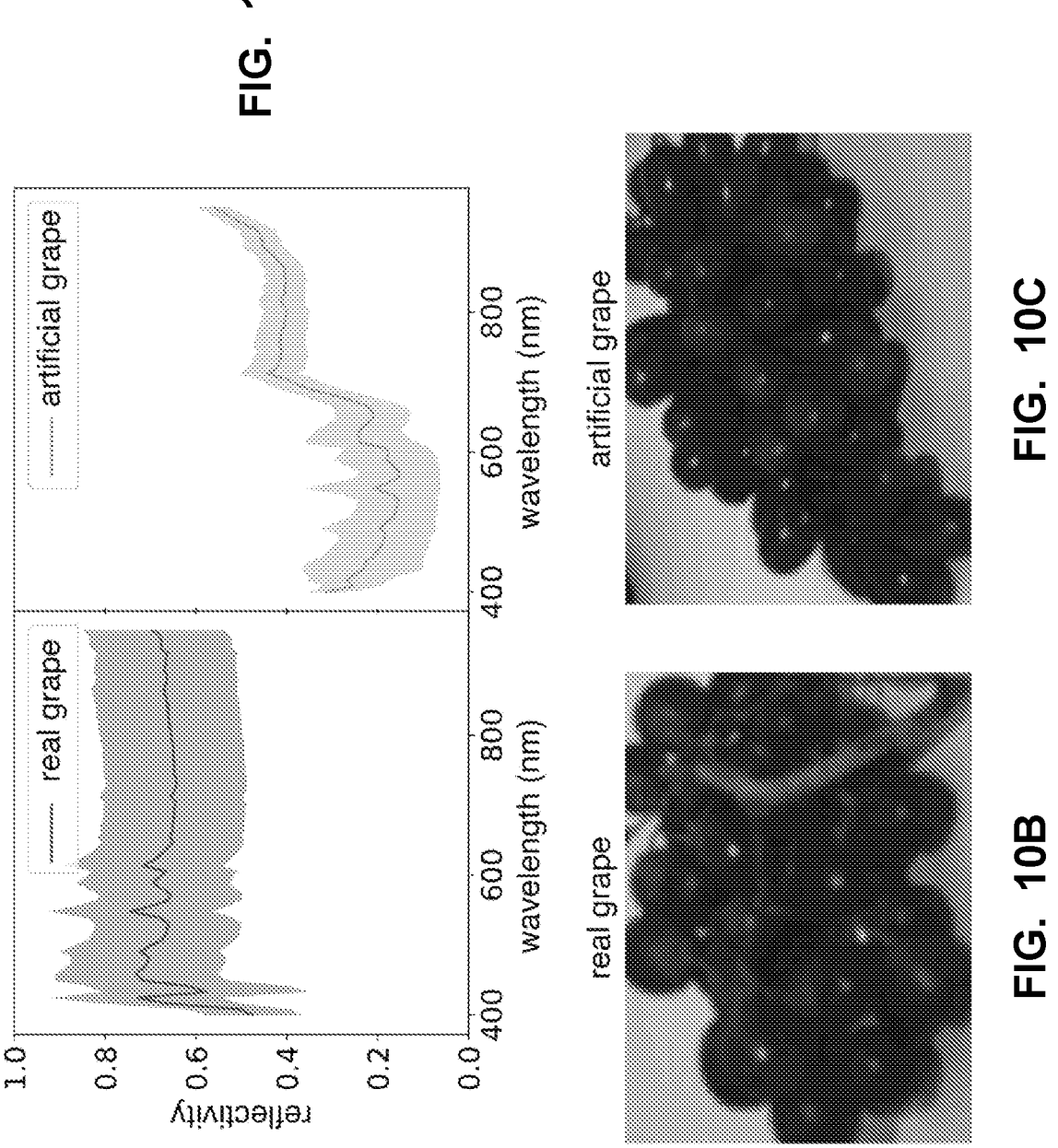
FIG. 10A is a pair of reflectivity plots for real and artificial grapes.
FIG. 10B is an image of real grapes, whose reflectivity is plotted in FIG. 10A.
FIG. 10C is an image of artificial grapes, whose reflectivity is plotted in FIG. 10A.

Referring now to FIGS. 7A to 7C, there is illustrated a comparison between spectral and RGB-based semantic segmentations. In the example shown, segmentation is performed between artificial and real fruits from scenes of the FVgNET dataset. Artificial and real fruits have similar RGB colors. However, they differ significantly in their reflection spectra, as shown in FIGS. 10A to 10C.

The performance of the described embodiments can be illustrated by training two classification networks for comparison purposes. One model uses the described encoders for semantic segmentation labeling, and the second the RGB channels. Both models use an identical U-Net-like decoder and identical parameters (number of epochs, batch size, learning rate). The results are summarized in FIGS. 7A to 7C, where FIG. 7A illustrates a comparison between segmentation masks generated from a spectral-informed model, an RGB-only model, and the ground truth, FIG. 7B illustrates the confusion matrix for the RGB-only model, and FIG. 7C illustrates the confusion matrix for the spectral-informed model. Each value in the confusion matrix represents the number of pixels of the segmentation mask of the item in the column that was classified as the item in the row.

While the mask quality is similar for both methods, the mean Intersection over Union (mIoU) score for the spectral-informed model is significantly higher compared to the RGB one. The mIoU computed with the theoretical and experimental responses of encoders reaches 81%, and 74. With the RGB model, conversely, the mIoU decreases to 68%. The confusion matrix of the RGB trained model shows that the RGB model struggles to predict correct results for real-artificial pairs of fruits with similar colors (e.g., FIG. 7B). The spectral-informed model, conversely, generates correct labels for most real-artificial pairs (e.g., FIG. 7C) and outperforms the RGB model in mIoU and F1. These results demonstrate that the small-sized barcodes generated by the described embodiments efficiently compress spectral features that convey key information about the objects imaged.

Figure 11:
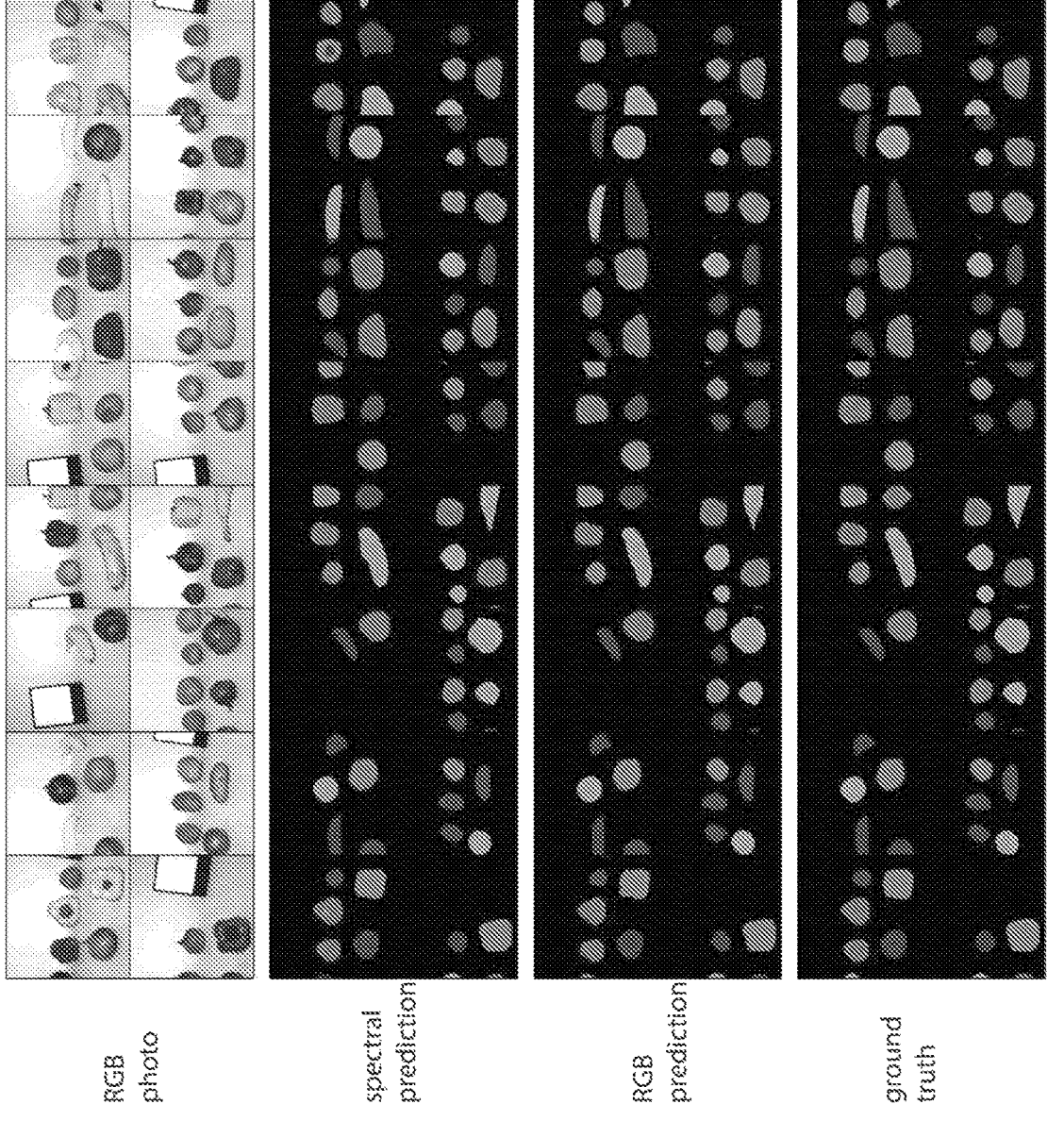
FIG. 11 is a table of images illustrating a comparison between RGB and spectral-informed models on semantic fruit segmentation.

Referring now to FIG. 11, there is illustrated a comparison between RGB and spectral-informed models on semantic fruit segmentation. In the upper, first row, there are shown 16 RGB photos of fruit. In the second row from top, there are shown 16 segmentation masks generated based on hyperspectral images corresponding to the 16 RGB photos in the first row. In the third row from top, there are shown 16 segmentation masks generated based on RGB images corresponding to the 16 RGB photos in the first row. In the fourth row from top, there are shown 16 segmentation masks generated based on the ground truth of the 16 RGB photos in the first row.

Figure 12:
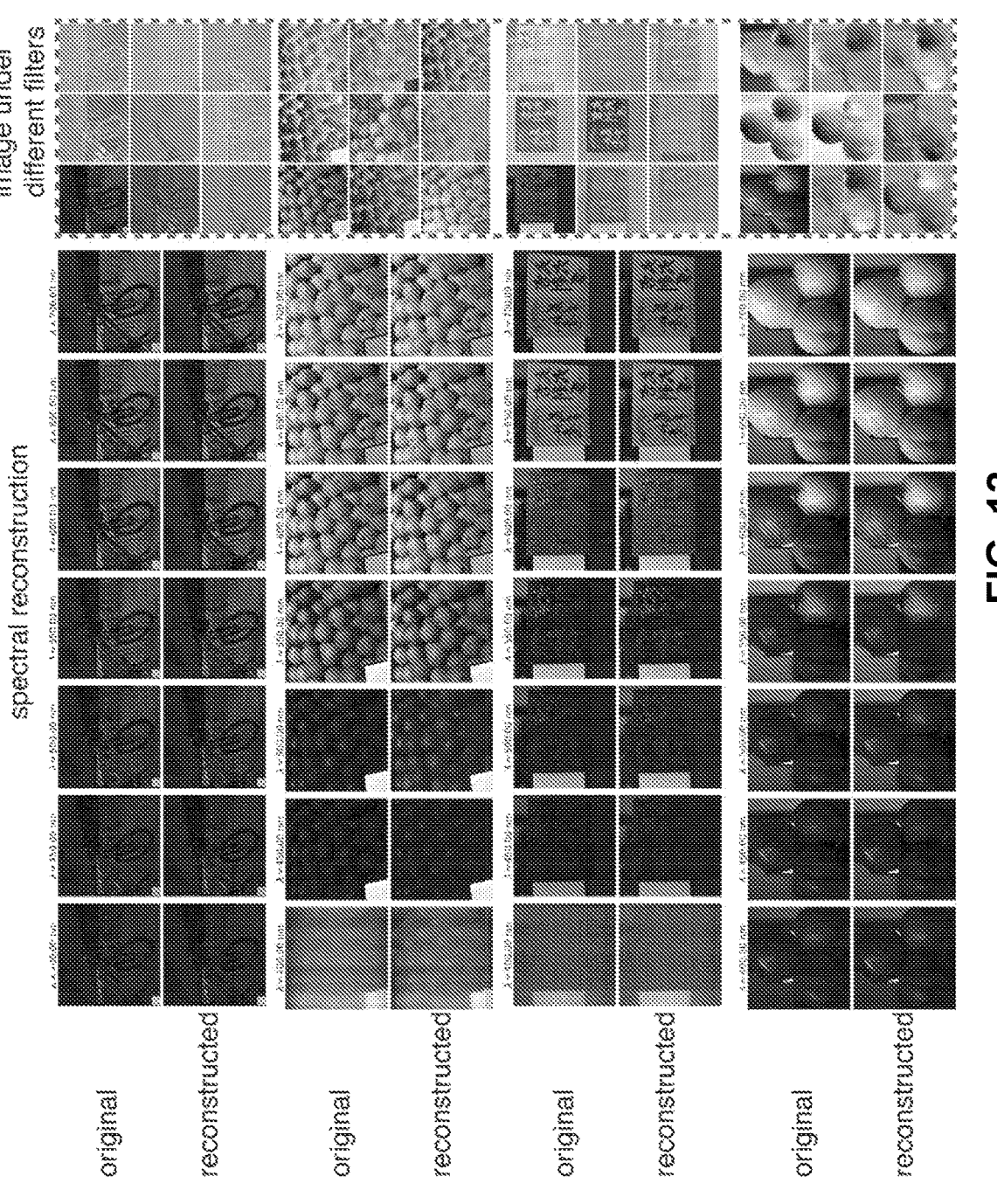
FIG. 12 is a series of images illustrating image spectral reconstruction at different wavelengths.

Referring now to FIG. 12, there is provided a series of images illustrating image spectral reconstruction at different wavelengths. The first and second rows from upper left illustrate the original image and spectral reconstruction for a bicycle at 7 different wavelengths. At right is a 3×3 grid simulating how the scene would be perceived through each of nine different encoders.

Similarly, the third and fourth rows illustrate the original image and spectral reconstruction for a fruit display at 7 different wavelengths, with a 3×3 grid at right simulating the perceived view of the scene through each of nine different encoders.

Similarly, the fifth and sixth rows illustrate the original image and spectral reconstruction for a writing sample at 7 different wavelengths, with a 3×3 grid at right simulating the perceived view of the scene through each of nine different encoders.

Similarly, the seventh and eighth rows illustrate the original image and spectral reconstruction for a fruit arrangement at 7 different wavelengths, with a 3×3 grid at right simulating the perceived view of the scene through each of nine different encoders.

Various apparatuses or processes have been described to provide examples of embodiments of the claimed subject matter. No such example embodiment described limits any claim and any claim may cover processes or apparatuses that differ from those described. The claims are not limited to apparatuses or processes having all the features of any one apparatus or process described above or to features common to multiple or all the apparatuses or processes described above. It is possible that an apparatus or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g. 112_a_, or 112-1). All elements with a common base number may be referred to collectively or generically using the base number without a suffix (e.g. 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g., a pushbutton keyboard, mouse, a touchscreen, and the like), and at least one output device (e.g., a display screen, a printer, a wireless radio, and the like) depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or apparatuses, it will be appreciated that other processes or apparatuses may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. A hyperspectral imaging apparatus, the apparatus comprising:

an encoder layer comprising an i*j array of encoding sub-arrays, each encoding sub-array comprising an m*n array of spectral encoders having a plurality of respective transmission characteristics, the plurality of respective transmission characteristics selected to encode a hyperspectral frequency range in a k-dimensional space, where k is m*n;

an imaging layer comprising an i*j array of detecting sub-arrays aligned with the i*j array of encoding sub-arrays of the encoder layer, each detecting sub-array comprising an m*n array of photodetectors, each photodetector arranged to detect a respective transmission response of a respective spectral encoder in response to broadband light, wherein the imaging layer outputs an i*j array of pixel responses, each pixel response comprising a pixel vector of m*n transmission responses; and a processor configured to decode the i*j array of pixel responses into a corresponding i*j array of pixel spectra to produce an output image encompassing the hyperspectral frequency range;

wherein i, j, m, and n are positive integers.

2. The apparatus of claim 1, wherein each spectral encoder is a flat optic device.

3. The apparatus of claim 2, wherein the flat optic device comprises a respective patterned nanostructure selected to produce the respective transmission characteristic.

4. The apparatus of claim 1, wherein each of the respective plurality of transmission characteristics is linear.

5. The apparatus of claim 1, wherein each of the respective plurality of transmission characteristics is non-linear.

6. The apparatus of claim 5, wherein the respective plurality of transmission characteristics of the respective spectral encoders within each encoding sub-array are selected by iteratively minimizing a loss function while optimizing the transmission characteristic for an application.

7. The apparatus of claim 1, wherein the respective plurality of transmission characteristics of the respective spectral encoders within each encoding sub-array are selected by determining k principal components that encode eigenvectors with minimum loss for an application.

8. The apparatus of claim 7, wherein the k principal components are determined by performing singular value decomposition.

9. The apparatus of claim 1, wherein the processor decodes each pixel response of the i*j array of pixel responses using a linear projector.

10. A hyperspectral imaging method, the method comprising:

providing an encoder layer comprising an i*j array of encoding sub-arrays, each encoding sub-array comprising an m*n array of spectral encoders having a plurality of respective transmission characteristics, the plurality of respective transmission characteristics selected to encode a hyperspectral frequency range in a k-dimensional space, where k is m*n;

providing an imaging layer comprising an i*j array of detecting sub-arrays aligned with the i*j array of encoding sub-arrays of the encoder layer, each detecting sub-array comprising an m*n array of photodetectors;

exposing the encoder layer to capture light;

detecting, at each photodetector, a respective transmission response of a respective spectral encoder in response to the broadband light;

outputting an i*j array of pixel responses from the imaging layer, each pixel response comprising a pixel vector of m*n transmission responses; and decoding the i*j array of pixel responses into a corresponding i*j array of pixel spectra to produce an output image encompassing the hyperspectral frequency range;

wherein i, j, m, and n are positive integers.

11. The method of claim 10, wherein each spectral encoder is a flat optic device.

12. The method of claim 11, wherein the flat optic device comprises a respective patterned nanostructure selected to produce the respective transmission characteristic.

13. The method of claim 10, wherein each of the respective plurality of transmission characteristics is linear.

14. The method of claim 10, wherein each of the respective plurality of transmission characteristics is non-linear.

15. The method of claim 14, wherein the respective plurality of transmission characteristics of the respective spectral encoders within each encoding sub-array are selected by iteratively minimizing a loss function while optimizing the transmission characteristic for an application.

16. The method of claim 10, wherein the respective plurality of transmission characteristics of the respective spectral encoders within each encoding sub-array are selected by determining k principal components that encode eigenvectors with minimum loss for an application.

17. The method of claim 16, wherein the k principal components are determined by performing singular value decomposition.

18. The method of claim 10, wherein the processor decodes each pixel response of the i*j array of pixel responses using a linear projector.

* * * * *